(12) United States Patent
Logothetis et al.

(10) Patent No.: US 11,678,384 B2
(45) Date of Patent: *Jun. 13, 2023

(54) TIMING ADJUSTMENT WITHIN A WIRELESS COMMUNICATION SYSTEM FOR A MOVING VEHICLE

(71) Applicant: AIRSPAN IP HOLDCO LLC, Boca Raton, FL (US)

(72) Inventors: Andrew Logothetis, Buckinghamshire (GB); Marlon Peter Persaud, Buckinghamshire (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 188 days.

This patent is subject to a terminal disclaimer.

(21) Appl. No.: 16/814,546

(22) Filed: Mar. 10, 2020

(65) Prior Publication Data

US 2020/0296774 A1    Sep. 17, 2020

(30) Foreign Application Priority Data

Mar. 11, 2019 (GB) ..................... 1903216

(51) Int. Cl.
*H04W 76/10* (2018.01)
*H04W 4/02* (2018.01)
*H04W 72/12* (2023.01)

(52) U.S. Cl.
CPC .......... *H04W 76/10* (2018.02); *H04W 4/023* (2013.01); *H04W 72/12* (2013.01)

(58) Field of Classification Search
CPC ..... H04W 76/10; H04W 4/023; H04W 72/12; H04W 56/004; H04W 64/00; H04W 56/0045; H04B 7/18506; H04B 7/185
(Continued)

(56) References Cited

U.S. PATENT DOCUMENTS

2004/0028018 A1    2/2004 Cain
2008/0084852 A1    4/2008 Karschnia
(Continued)

FOREIGN PATENT DOCUMENTS

CN    108243391 A    7/2018
EP    2427018 A1     3/2012
(Continued)

OTHER PUBLICATIONS

GB1903216.8—Search Report dated Aug. 12, 2019, 6 pages.
(Continued)

*Primary Examiner* — Michael Y Mapa
(74) *Attorney, Agent, or Firm* — Andrew L. Dunlap; Haynes Beffel & Wolfeld LLP

(57) ABSTRACT

A mechanism is provided for performing timing adjustment within a wireless communication system for a moving vehicle. The wireless communication system has an antenna system for communicating with a further antenna system, and communication control circuitry for performing a sign-on procedure to seek to establish a communication link with the further antenna system. During the sign-on procedure, the communication control circuitry issues via the antenna system a connection setup signal for receipt by the further antenna within an identified timing window. The wireless communication system also has location specifying circuitry for identifying a current location of the wireless communication system, and distance computation circuitry for obtaining location information specifying a location of the further antenna system, and for determining a separation distance between the antenna system and the further antenna system. The communication control circuitry is arranged to issue the connection setup signal at a default time unless the separation distance exceeds a setup threshold distance that indicates that use of the default time would prevent the connec- (Continued)

tion setup signal being received within the identified timing window. In that event, the control circuitry instead applies a timing advance in order to issue the connection setup signal prior to the default time so as to cause the connection setup signal to be received by the further antenna system within the identified timing window. This facilitates successful establishment of a communication link even in situations where the separation distance between the antenna system and the further antenna system exceeds that supported by modern telecommunications Standards.

15 Claims, 14 Drawing Sheets

(58) Field of Classification Search
USPC ............ 455/450–452.2, 456.1–457; 370/252
See application file for complete search history.

(56) References Cited

U.S. PATENT DOCUMENTS

| | | | |
|---|---|---|---|
| 2008/0123569 A1 | 5/2008 | Doss et al. | |
| 2009/0161599 A1* | 6/2009 | Haartsen | H04W 74/0891 |
| | | | 455/434 |
| 2014/0119206 A1* | 5/2014 | Vargantwar | H04W 56/00 |
| | | | 370/252 |
| 2015/0085834 A1 | 3/2015 | Liu et al. | |
| 2015/0181544 A1 | 6/2015 | Liu et al. | |
| 2015/0334707 A1 | 11/2015 | Rajagopalan et al. | |
| 2017/0111103 A1* | 4/2017 | Rowland | H04W 56/0005 |
| 2018/0254825 A1* | 9/2018 | Speidel | H04W 56/0045 |

FOREIGN PATENT DOCUMENTS

| | | |
|---|---|---|
| EP | 3030018 A1 | 6/2016 |
| EP | 3157296 A1 | 4/2017 |
| EP | 3182781 A1 | 6/2017 |
| WO | 2013063789 A1 | 5/2013 |
| WO | 2017107195 A1 | 6/2017 |

OTHER PUBLICATIONS

Alcatel-Lucent—'Using air-to-ground LTE for in-flight ultra-broadband', 12 pages, 2015.
EP 20157730.1.8—Extended European Search Report dated Aug. 24, 2019, 13 pages.
GB1903216.8—Exam Report dated May 9, 2022, 6 pages.
EP 20157730.1—Extended European Search Report dated Nov. 20, 2020, 13 pages.
GB1903216.8—Exam Report dated Oct. 21, 2021, 7 pages.

* cited by examiner

TIMING ADJUSTMENT WITHIN A WIRELESS COMMUNICATION SYSTEM FOR A MOVING VEHICLE

BACKGROUND

The present technique relates to the field of wireless communications.

It is known to provide air-to-ground (ATG) communication systems for communication between moving aircraft and a network of ground stations. Such systems can, for example, be used to provide a hotspot within the aircraft in order to provide connectivity to passengers in the aircraft. With increasing demands for higher capacity, there is a desire to support modern telecommunications Standards such as 4G (LTE) in ATG systems. However, this presents a number of technical issues.

SUMMARY

In one example arrangement, there is provided a wireless communication system for a moving vehicle, comprising: an antenna system to communicate with a further antenna system; communication control circuitry to perform a sign-on procedure to seek to establish a communication link with the further antenna system, during which the communication control circuitry is arranged to issue via the antenna system a connection setup signal for receipt by the further antenna system within an identified timing window; location specifying circuitry to identify a current location of the wireless communication system; distance computation circuitry to obtain location information specifying a location of the further antenna system and to determine a separation distance between the antenna system and the further antenna system; wherein the communication control circuitry is arranged to issue the connection setup signal at a default time unless the separation distance exceeds a setup threshold distance that indicates that use of the default time would prevent the connection setup signal being received within the identified timing window, in which event the communication control circuitry is arranged to apply a timing advance in order to issue the connection setup signal prior to the default time so as to cause the connection setup signal to be received by the further antenna system within the identified timing window.

In another example arrangement, there is provided an apparatus comprising: a further antenna system for communication with an antenna system of a wireless communication system for a moving vehicle, where communications between the antenna system and the further antenna system occur within communication frames; scheduling circuitry to control allocation of sub-frames within each communication frame, and to issue a signal to the antenna system identifying the sub-frames allocated to the antenna system for uplink communication from the antenna system to the further antenna system and for downlink communication from the further antenna system to the antenna system; and distance computation circuitry to obtain location information specifying a location of the antenna system and to determine a separation distance between the antenna system and the further antenna system; wherein the scheduling circuitry is arranged to choose each sub-frame allocated to the antenna system for uplink communication based on the separation distance, such that a receive/transmit timing constraint will not be violated by the antenna system.

In a still further example arrangement, there is provided a method of performing a timing adjustment in a wireless communication system for a moving vehicle having an antenna system to communicate with a further antenna system, comprising: performing a sign-on procedure to seek to establish a communication link with the further antenna system, during which a connection setup signal is issued via the antenna system for receipt by the further antenna system within an identified timing window; identifying a current location of the wireless communication system; obtaining location information specifying a location of the further antenna system and determining a separation distance between the antenna system and the further antenna system; wherein during the sign-on procedure the connection setup signal is issued at a default time unless the separation distance exceeds a setup threshold distance that indicates that use of the default time would prevent the connection setup signal being received within the identified timing window, in which event a timing advance is applied in order to issue the connection setup signal prior to the default time so as to cause the connection setup signal to be received by the further antenna system within the identified timing window.

In an additional example arrangement, there is provided a method of performing uplink scheduling in an apparatus having a further antenna system for communication with an antenna system of a wireless communication system for a moving vehicle, where communications between the antenna system and the further antenna system occur within communication frames, comprising: controlling allocation of sub-frames within each communication frame, and issuing a signal to the antenna system identifying the sub-frames allocated to the antenna system for uplink communication from the antenna system to the further antenna system and for downlink communication from the further antenna system to the antenna system; obtaining location information specifying a location of the antenna system and determining a separation distance between the antenna system and the further antenna system; and during the controlling of allocation of sub-frames within each communication frame, each sub-frame allocated to the antenna system for uplink communication is chosen based on the separation distance, such that a receive/transmit timing constraint will not be violated by the antenna system.

In another example arrangement, there is provided a wireless communication system for a moving vehicle, comprising: antenna means for communicating with a further antenna means; communication control means for performing a sign-on procedure to seek to establish a communication link with the further antenna means, during which the communication control means is arranged to issue via the antenna means a connection setup signal for receipt by the further antenna means within an identified timing window; location specifying means for identifying a current location of the wireless communication system; distance computation means for obtaining location information specifying a location of the further antenna means and for determining a separation distance between the antenna means and the further antenna means; wherein the communication control means is arranged to issue the connection setup signal at a default time unless the separation distance exceeds a setup threshold distance that indicates that use of the default time would prevent the connection setup signal being received within the identified timing window, in which event the communication control means is arranged to apply a timing advance in order to issue the connection setup signal prior to the default time so as to cause the connection setup signal to be received by the further antenna means within the identified timing window.

In a still further example arrangement, there is provided an apparatus comprising: a further antenna means for communication with an antenna means of a wireless communication system for a moving vehicle, where communications between the antenna means and the further antenna means occur within communication frames; scheduling means for controlling allocation of sub-frames within each communication frame, and for issuing a signal to the antenna means identifying the sub-frames allocated to the antenna means for uplink communication from the antenna means to the further antenna means and for downlink communication from the further antenna means to the antenna means; and distance computation means for obtaining location information specifying a location of the antenna means and for determining a separation distance between the antenna means and the further antenna means; wherein the scheduling means is arranged to choose each sub-frame allocated to the antenna. means for uplink communication based on the separation distance, such that a receive/transmit timing constraint will not be violated by the antenna means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
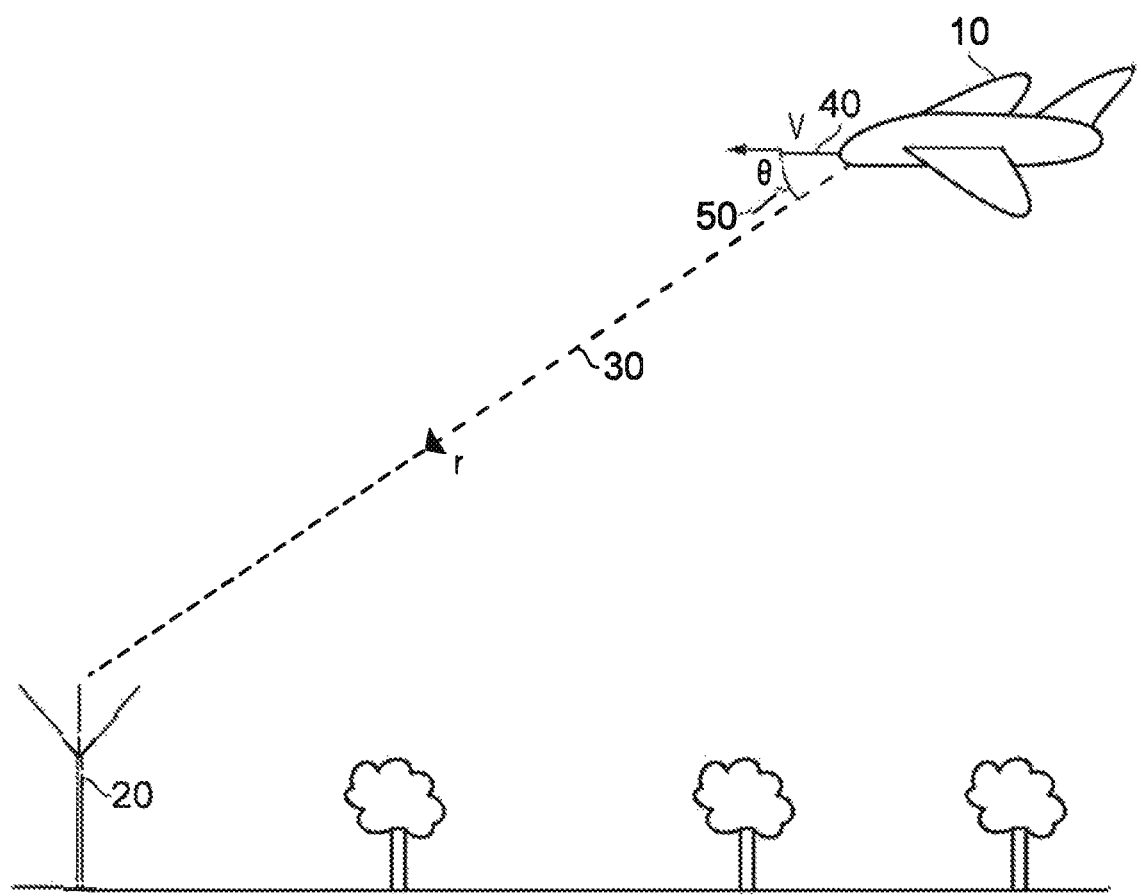
FIG. 1 is a diagram schematically illustrating an air-to-ground (ATG) communication between an aircraft and a ground station.

As mentioned earlier, a number of technical issues can arise when seeking to support modern telecommunications Standards such as 4G (LTE) in systems such as ATG systems. One particular issue that arises is in relation to performing a sign-on procedure using the antenna system in a moving vehicle, in order to seek to establish a communication link with a further antenna system in the ground terminal.

In particular, when using a modern telecommunications Standard such as 4G (LTE), it is necessary during the sign-on procedure for the antenna system in the moving vehicle to issue a connection setup signal so that it can be received by the further antenna system in the ground terminal within an identified timing window. In accordance with the 4G (LTE) Standard, such a connection setup signal may be referred to as a RACH (random access channel) signal that can be issued in a random access channel during an uplink communication from the moving vehicle to the ground terminal, in order to seek to establish a communication link, and that connection setup signal is required to be received within a specific timing window. There are various formats of connection setup signal that can be used, but the maximum separation distance between the moving vehicle and ground terminal that can be supported is of the order of approximately 100 km. If the separation distance exceeds that, then the connection setup signal will not be received within the specified timing window, and a communication link will hence not be established.

However, in known ATG systems, the network of ground terminals may be such that the separation distance between the aircraft and the ground terminal with which a communication link is sought to be established may be up to 300 km. The techniques described herein provide a mechanism that enables a communication link to be established within such systems when using modem telecommunications Standards such as 4G (LTE), and hence which facilitates an increase in the capacity available when seeking to provide connectivity to passengers in the aircraft.

Whilst an aircraft is given as an example of a moving vehicle to which the techniques described herein may be applied, the techniques can be applied to other types of moving vehicles, for example a train, where the ground terminals may typically be spread out along the track.

In one example arrangement a wireless communication system for a moving vehicle is provided that comprises an antenna system to communicate with a further antenna system, and communication control circuitry to perform a sign-on procedure to seek to establish a communication link with the further antenna system. During the sign-on procedure, the communication control circuitry is arranged to issue via the antenna system a connection setup signal for receipt by the further antenna system within an identified timing window.

The wireless communication system is also provided within location specifying circuitry to identify a current location of the wireless communication system, and distance computation circuitry to obtain location information specifying a location of the further antenna system, and to determine a separation distance between the antenna system and the further antenna system.

By default, the communication control circuitry is arranged to issue the connection setup signal at a default time unless the separate distance exceeds a setup threshold distance that indicates that the use of the default time would prevent the connection setup signal being received within the identified timing window. In that event, the communication control circuitry deviates from the above default procedure, and instead applies a timing advance in order to issue the connection setup signal prior to the default time so as to cause the connection setup signal to be received by the further antenna system within the identified timing window.

By applying a timing advance, this can be used to ensure that the delay in propagation of the connection setup signal to the further antenna system is compensated for, so that that connection setup signal can still be received within the identified timing window, and hence a communication link can be successfully established.

In one example implementation the amount of the timing advance is dependent on the separation distance. Whilst the timing advance could be computed for each specific separation distance, in one example implementation timing advances can be specified for different ranges of separation distance. Hence, the communication control circuitry may be arranged to determine the amount of the timing advance dependent on which of a plurality of ranges of separation distance the currently measured separation distance falls within.

In one example implementation, the communication control circuitry is arranged to limit the amount of the timing advance so as to ensure that a receive/transmit timing constraint is not violated. Whether there is a receive/transmit timing constraint to be considered will depend on the form of communication used. For example, when using a TDD (Time Division Duplex) scheme, the antenna system will only be able to transmit signals or receive signals at any particular point in time, and this can give rise to the need to consider the possibility of a receive/transmit timing constraint when computing the timing advance to apply. However, if alternatively an FDD (Frequency Division Duplex) scheme is used, the antenna system can receive and transmit simultaneously and so such a timing constraint issue will not arise.

When using schemes that may give rise to a receive/transmit timing constraint, then depending on the type of connection setup signal sent, and the form of the identified timing window (such as the number of sub-frames defining the timing window), it may be that the timing advance that would be applied based purely on a determination of the separation distance could violate such a receive/transmit timing constraint. In particular, as mentioned above the antenna system may be arranged so that it is only able to transmit signals or receive signals at any particular point in time, and hence cannot simultaneously be transmitting and receiving signals. Communications between the antenna system and the further antenna system may occur within communication frames, and certain portions of the communication frame may be used for downlink communication whilst other portions are used for uplink communication. The receive/transmit timing constraint will hence require the antenna. system to remain configured for reception during any portion of a communication frame where the antenna system may receive a downlink signal from the further antenna system. Hence, the communication control circuitry should not advance the timing to an extent where it would be seeking to transmit the communication setup signal at a time where the antenna system should still be configured for reception.

It should be noted that it is not always necessary to seek to compensate for the receive/transmit timing constraint. For example, if a certain form of connection setup signal is used (in the specific examples described hereafter that being a format where the connection setup signal is less than a sub-frame in length, and the identified timing window is a single sub-frame), then in one example implementation it is the case that the timing advance can be computed solely based on the separation distance without risk of violating the receive/transmit timing constraint.

As mentioned earlier, communications between the antenna system and the further antenna system may occur within communication frames. A communication frame can be defined in one implementation in terms of both frequency and time, and can be considered as consisting of a plurality of sub-frames. Each sub-frame may comprise a number of resource blocks, a resource block being the smallest allocatable part of the communication frame.

The default time at which the connection setup signal is issued by the communication control circuitry can be specified as a time relative to a start of the communication frame.

Further, as mentioned earlier, each communication frame may comprise a plurality of sub-frames and the identified timing window may comprise one or more sub-frames.

In one example implementation, the timing advance chosen by the communication control circuitry in the event that the separation distance exceeds the setup threshold distance can be considered as a coarse timing advance. In particular, it does not need to be a precise timing advance, but merely needs to be sufficient to ensure that the entirety of the connection setup signal will be received within the identified timing window. In such implementations, when a communication link is established between the antenna system and the further antenna system, the antenna system receives a response signal that may identify a further timing advance. The communication control circuitry is then arranged, when the connection setup signal was issued by applying the timing advance, to use both the timing advance and the further timing advance to control timing of a subsequent uplink communication to the further antenna system. Hence, by using the coarse timing advance to ensure that the connection setup signal is properly received within the identified timing window, then the standard timing advice mechanism applied by the further antenna system can be used to specify an additional timing advance, that can be used in combination with the coarse timing advance to control the actual timing advance used for a subsequent uplink communication.

It should be noted that for the above process, the further antenna system does not need to be aware of the separation distance between the moving vehicle and that further antenna system, and in effect the application of a coarse timing advance by the communication control circuitry within the moving vehicle fools the further antenna system into viewing the moving vehicle as being closer than it actually is. In particular, the advancement of the issuance of the connection setup signal can compensate for a significant portion of the delay in propagation of the communication setup signal to the further antenna system.

However, a further consideration that can arise when using such a technique is that the further antenna system is also used to allocate uplink and downlink resources to the antenna system of the moving vehicle, for use in subsequent communications between the moving vehicle and the further antenna system. In particular, the further antenna system may control allocation of sub-frames within each communication frame, and when a communication link is established between the antenna system and the further antenna system, the response signal received by the antenna system may further identify the sub-frames allocated for uplink and downlink communication between the antenna system and the further antenna system.

However, it has been realised that, even though successful establishment of a communication link can be achieved by using the advance timing mechanism described above, the subsequent uplink communications could still violate the receive/transmit timing constraint in some situations. In accordance with the techniques described herein, the sub-frames that are allocated for the uplink communication are chosen so as to avoid such a timing constraint violation occurring. In particular, in one example arrangement, each sub-frame allocated to the antenna system for uplink communication is then chosen by the further antenna system based on the separation distance, such that a receive/transmit timing constraint will not be violated when both the timing advance and the further timing advance are used to control timing of a subsequent uplink communication to the further antenna system.

There are a number of ways in which the above functionality can be achieved. In one example arrangement, each allocated sub-frame identified in the response signal for uplink communication resides within a chosen group of the multiple sub-frames, where the chosen group is dependent on which of a plurality of ranges of separation distance the separation distance falls within.

For instance, in one example implementation the chosen group is such that at least a first sub-frame in the multiple sub-frames is excluded from allocation when the separation distance exceeds a scheduling threshold distance. Hence, as the separation distance increases beyond the scheduling threshold distance, one or more of the earlier appearing sub-frames in the communication frame that could be allocated for uplink communication are not used, and instead later sub-frames are allocated. This ensures that when the cumulative timing advance is applied (based on the coarse timing advance chosen by the communication control circuitry when issuing the original connection setup signal, and the fine timing advance provided in the setup response from the further antenna system), the communication control circuitry will still not be seeking to configure the antenna system for transmission at a time where that antenna system needs to be configured for reception.

In one example implementation, the number of sub-frames in the multiple sub-frames that can be allocated for uplink communication is dependent on a maximum supported separation distance between the antenna system and the further antenna system.

Whilst the multiple sub-frames could be configured in a variety of ways, in one example implementation the multiple sub-frames that can be allocated for uplink communication are consecutive sub-frames within the communication frame.

The location specifying circuitry can take a variety of forms, but in one example implementation comprises a GPS receiver. Such GPS receivers are readily available and provide a relatively low cost solution for obtaining an accurate positioning of the wireless communication system.

In one example implementation, the antenna system is arranged to receive an initial signal from the further antenna system advising of the availability for the connection setup signal to be issued, and providing information regarding the identified timing window. Hence, the antenna system can be used to monitor signals from ground terminals, looking for communications that advise of the possibility of establishing a communication link. Such communications will identify the timing window and also the form of connection setup signal to be used.

In one example arrangement the initial signal further provides an antenna system identifier for the further antenna system, and the distance computation circuitry may be arranged to access a storage that maps antenna system identifiers to location information for the associated antenna systems, in order to determine the location information for the further antenna system.

Such an antenna system identifier is part of the standard communication protocol used in modern telecommunication Standards such as 4G (LTE). However, it will be appreciated that other mechanisms could be used if desired in order to enable the distance computation circuitry to obtain location information specifying a location of the further antenna system. For example, that location information could be encoded directly within the signal received from the further antenna system.

In one example arrangement, an apparatus (e.g. a ground terminal) is provided for communicating with the wireless communication system of a moving vehicle as discussed earlier. Such an apparatus may comprise a further antenna system for communicating with the antenna system of the wireless communications system of the moving vehicle, where communications between the antenna system and the further antenna system occur within communication frames. The apparatus also has scheduling circuitry to control allocation of sub-frames within each communication frame, and to issue a signal to the antenna system identify the sub-frames allocated to the antenna system for uplink communication from the antenna system to the further antenna system, and for downlink communication from the further antenna system to the antenna system.

The apparatus also has distance computation circuitry to obtain location information specifying a location of the antenna system, and for determining a separation distance between the antenna system and the further antenna system. The scheduling circuitry is arranged to choose each sub-frame allocated to the antenna system for uplink communication based on the separation distance, such that a receive/transmit timing constraint will not be violated by the antenna system.

As discussed earlier, such an approach enables the scheduling circuitry to take account of the separation distance when scheduling sub-frames for uplink communication, such that as the separation distance increases beyond a scheduling threshold distance one or more of the earlier appearing sub-frames in the communication frame that could in principle be allocated for uplink communication will not be used, and instead later sub-frames are allocated.

It is expected that in many deployment scenarios the traffic between the moving vehicle and the ground terminal will be heavily downlink centric. In one example implementation multiple communication frame formats are supported, and the ground terminal is able to change between communication frame formats to seek to increase where possible the proportion of the communication frame available for downlink communication, taking into account the separation distance with connected moving vehicles.

In particular, in one example implementation the apparatus is arranged to establish communication links with the wireless communication system of multiple moving vehicles, and the apparatus supports the use of a plurality of different communication frame formats, each communication frame format having a different number of sub-frames that can be allocated for uplink communication. The scheduling circuitry may then be arranged to take into account the separation distance between the apparatus and each of the multiple moving vehicles when determining which communication frame format to use for communication with the multiple moving vehicles. Hence, where the separation distances permit, the apparatus can change to using a communication frame format with less sub-frames used for uplink communication, and with a corresponding increase in the number of sub-frames available for downlink communication.

Particular examples will now be described with reference to the Figures.

The moving vehicles for which the techniques described herein can be utilised can take a variety of forms. For instance, the techniques could be applied in respect of trains, where the ground terminals may be spread out along the track. However, for the purposes of the examples discussed herein, it will be assumed that the moving vehicle is an aircraft, such as the airplane 10 shown in FIG. 1 As shown in FIG. 1, the airplane 10 is able to communicate with a ground terminal 20 (which may also be referred to herein as a ground station). A network of ground terminals will be provided, enabling the aircraft 10 to connect to different ground terminals during a flight in order to seek to maintain a communication link that can be used to provide connectivity to passengers in the aircraft. As shown in FIG. 1, the aircraft 10 is assumed to be travelling at a velocity 40, and has a relative separation 30 between it and the ground terminal that it is connected to. This relative separation can be specified as a vector, as can the velocity 40, and there will be an angular separation between the velocity vector and the relative separation vector, namely the angle 50 shown in FIG. 1.

Figure 2:
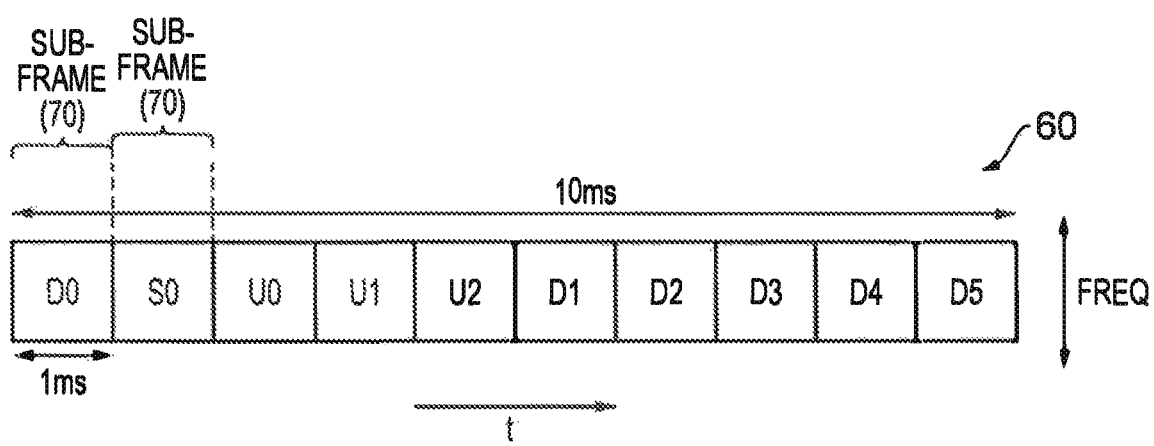
FIG. 2 schematically illustrates the format of a communication frame used in one example implementation.

Communication between the aircraft 10 and a ground station 20 with which a communication link is established can take place within communication frames. An example communication frame that may be used is illustrated in FIG. 2. Here, the communication frame 60 is defined in both the frequency and time domains. In particular, in the time domain, the frame can be considered as consisting of a plurality of sub-frames 70. In one particular example, a communication frame 60 is 10 milliseconds (ms) long, and there are ten sub-frames in the communication frame, where each sub-frame has a duration of 1 ms.

Each sub-frame 70 comprises a number of resource blocks (the resource blocks not being shown separately in FIG. 2), a resource block being the smallest allocable portion of the communication frame.

A sub-frame may be allocated for downlink communication (also referred to herein as forward link communication) from a ground terminal 20 to the aircraft 10, or can be allocated for uplink communication (also referred to herein as reverse link communication) from the aircraft 10 to the ground terminal 20. In FIG. 2, sub-frames allocated for downlink communication are prefixed with the letter "D" and sub-frames allocated for uplink communication are prefixed with the letter "U". As also shown in FIG. 2, one or more sub-frames may be allocated as special sub-frames (prefixed by the letter "S"). These can be used as a gap sub-frame to provide some separation between downlink communication and uplink communication. However, it is possible that not the entirety of the special sub-frame is left as a gap. In particular, each sub-frame can be considered as consisting of a plurality of symbols, in one particular example there being 14 symbols within each sub-frame. Hence, one or more of the symbols may be allocated for downlink communication and one or more of the symbols may be allocated for uplink communication, with the remaining symbols being left free. In one specific implementation of the communication frame format shown in FIG. 2, the first three symbols within the special sub-frame SO can be used for downlink communication, and the final symbol may be used for uplink communication. This leaves 10 symbols free, which in one embodiment equates to a 0.712 ms gap.

Figure 3:
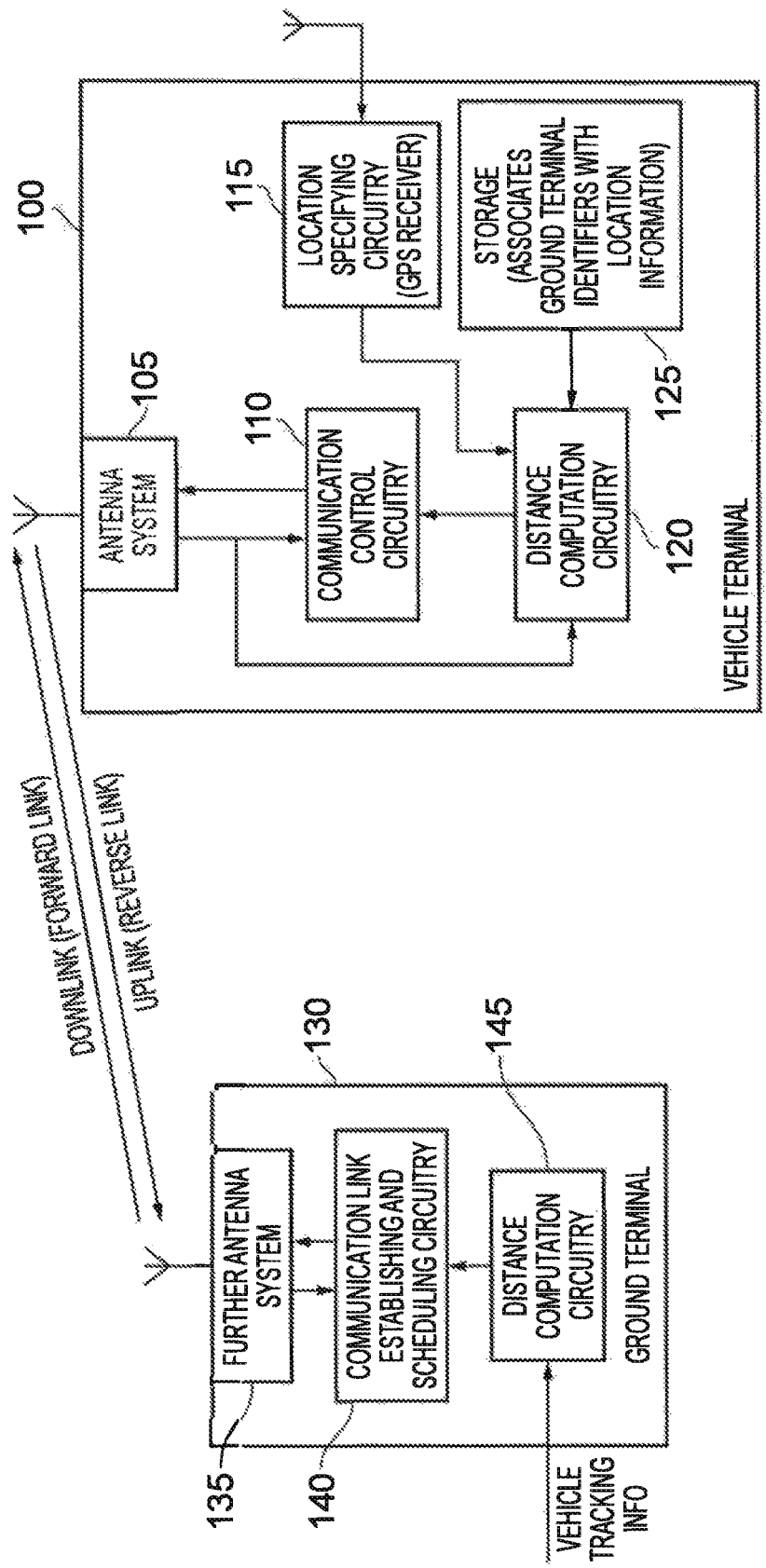
FIG. 3 is a block diagram illustrating components provided within a vehicle terminal and a ground terminal in accordance with one example arrangement.

FIG. 3 is a block diagram illustrating more details of the components provided within a vehicle terminal 100 and a ground terminal 130. The vehicle terminal 100 may for example be provided within the aircraft 10 shown in FIG. 1, whereas the ground terminal 130 may form the ground station 20 shown in FIG. 1, The vehicle terminal 100 has an antenna system 105 used to communicate wirelessly with the ground terminal 130. The antenna system 105 may include all of the electronics used to convert between baseband and RF signals for both data to be transmitted from the vehicle terminal's antenna and for data received by the vehicle terminal's antenna. Communication control circuitry 110 is provided for controlling the operation of the antenna system 105. To assist the communication control circuitry 110 in performing the control operations to be described in more detail herein, the communication control circuitry 110 has access to distance computation circuitry 120 that can be used to determine the separation between the vehicle terminal 100 and the ground terminal 130. In some example implementations, that separation is expressed as a vector identifying the relative separation between the two antenna systems, whilst in other implementations that separation may be expressed as an absolute separation distance (i.e. a scalar term rather than a vector term).

The distance computation circuitry 120 may have access to location specifying circuitry 115 that can provide information identifying the current location of the vehicle terminal 100. The location specifying circuitry can take a variety of forms, but in one example implementation is a UPS receiver.

The distance computation circuitry 120 can be arranged to operate in a variety of ways, but in one example implementation extracts information from a downlink communication in order to seek to identify the location of the ground terminal 130. That information could in principle directly identify the coordinates of the ground terminal, but in one example implementation that information is an identifier of the ground terminal, and the distance computation circuitry uses that identifier in order to obtain the coordinates of the ground terminal.

In particular, as shown in FIG. 3, in one example implementation the vehicle terminal 100 has a storage device 125 providing a correlation between ground terminal identifiers and associated location information. Accordingly, a lookup operation can be performed within the storage using the identifier information extracted from the downlink signal, in order to obtain the location information of the ground terminal. Using that information, and the location information from the GPS receiver 115, the distance computation circuitry 120 can then calculate the separation between the vehicle terminal and the ground terminal.

As shown in FIG. 3, the ground terminal will include a further antenna system 135, which is controlled by communication link establishing and scheduling circuitry 140. The functionality performed by the communication link establishing and scheduling circuitry 140 will be discussed in more detail later. However, in one implementation that component has access to distance computation circuitry 145 that can compute the separation between the ground terminal 130 and the vehicle terminal 100, As with the earlier-discussed distance computation circuitry 120, the distance computation circuitry may produce that separation as a vector quantity, or as a scalar quantity dependent on implementation. In one example implementation, the distance computation circuitry will know the coordinate information of the ground terminal 130, which it will be appreciated is fixed, and will obtain vehicle tracking information indicative of the current location of the vehicle terminal 100. This vehicle tracking information can be obtained in a variety of ways. However, considering the example of an aircraft 10 shown in FIG. 1, it will be appreciated that there are available resources that track in real time the coordinates of aircrafts, and that information can be obtained in order to provide the distance computation circuitry 145 with the required vehicle tracking information for the vehicle terminal 100.

One of the functions performed by the communication control circuitry 110 is to perform a sign-on procedure to seek to establish a communication link with the ground terminal 130, During that sign-on procedure, the communication control circuitry 110 will issue a connection setup signal for receipt by the further antenna system 135 within an identified timing window. The vehicle terminal 100 will firstly receive an initial signal from the ground terminal 130 advising of the availability for the connection setup signal to be issued, and providing information regarding the identified timing window. The timing window will typically occupy one or more sub-frames, and the connection setup signal will have a duration less than the identified timing window, but will need to be received in its entirety within that timing window in order for a connection to successfully be established.

In accordance with the techniques described herein, it is assumed that communications are taking place in accordance with the 4G (LTE) Standard, and such a connection setup signal may be referred to as a RACH (random access channel) signal that is issued in a random access channel during an uplink communication from the moving vehicle to the ground terminal. Different RACH configurations may be supported, for example associated with different sized RACH signals and associated different sized timing windows.

Figure 4A:
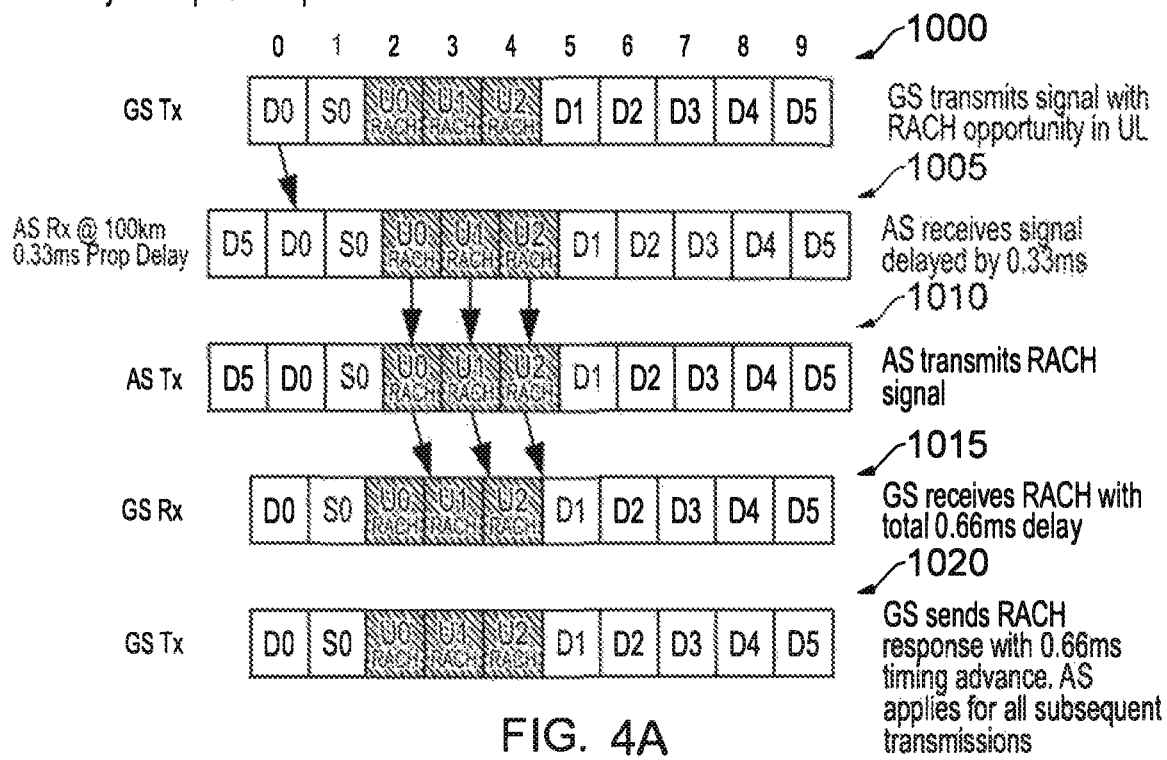
FIG. 4A illustrates how a connection setup signal (a RACH signal) can be successfully communicated from a vehicle terminal to a ground terminal using the communication frame of FIG. 2 provided the vehicle terminal is no more than 108 km from the ground terminal.

FIG. 4A illustrates an example form of RACH configuration that could be used when adopting the communication frame format of FIG. 2, and in situations where the separation between the aircraft 10 and the ground terminal 20 does not exceed 108 km. Here the timing window occupies three sub-frames. As indicated by the communication frame 1000, it is assumed that the ground station 20 transmits a signal identifying that there is a RACH opportunity that the aircraft can utilise in an uplink communication back to the ground terminal 20. As shown by the line 1005 in FIG. 4A, the receipt of the communication frame at the aircraft is delayed by approximately 0.33 ms, due to the separation between the aircraft and the ground terminal (in this case it being assumed that there is essentially the maximum separation that can be supported using this RACH format). As shown by the line 1010, it is assumed that the aircraft 10 then transmits the RACH signal, in this case the RACH signal being propagated across all three of the uplink communication sub-frames.

It will be appreciated that that uplink transmission will also be delayed by the same propagation delay, and hence will be received by the ground terminal 20 at approximately 0.66 ms delay (as indicated by the line 1015), due to the round trip delay between the ground terminal and the aircraft. However, the timing control at the ground terminal is fixed, and hence it will assume the timing of the sub-frames is aligned with the initial timing shown by the entry 1000. Hence, it will interpret the received information on that basis.

In this case it is assumed that the RACH signal is received entirely within the RACH timing window, and based on the relative offset of that RACH signal, the ground station can identify that the total propagation delay is 0.66 ms. Accordingly, in a subsequent communication frame 1020 where the ground station provides a response to identify that a successful communication link has been established, that response signal from the ground station will identify that the aircraft should advance its timing for subsequent uplink communication by 0.66 ms. As a result, this will ensure that the subsequent uplink communication is aligned with the sub-frame timing boundaries as implemented by the ground terminal 20.

Figure 4B:
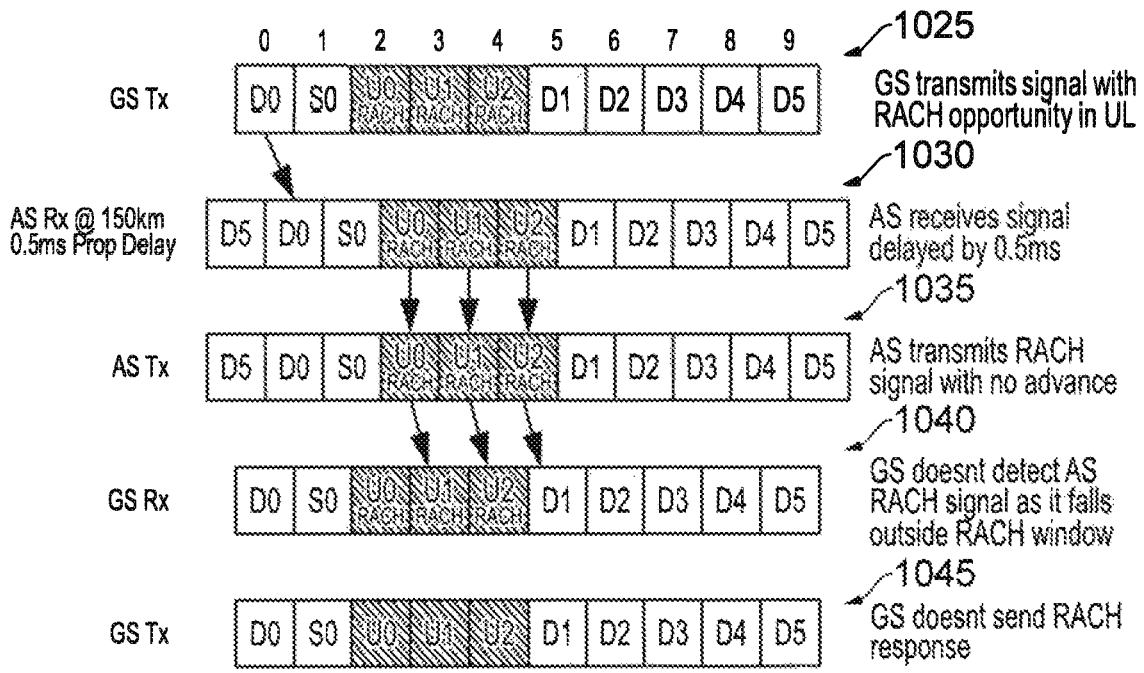
FIG. 4B illustrates how when the distance between the vehicle terminal and the ground terminal exceeds 108 km the connection setup signal will not be successfully received by the ground terminal when adopting the scheme of FIG. 4A.

FIG. 4B illustrates the use of the same example RACH configuration, but in a situation where the separation exceeds the maximum separation distance of 108 km. In this specific example, it is assumed that the separation is 150 km resulting in a 0.5 ms propagation delay from the ground terminal 20 to the aircraft 10. As shown by the line 1025, the ground terminal 20 emits the same initial signal as discussed earlier with reference to the line 1000 of FIG. 4A, and hence identifies a RACH opportunity. However, as shown by the line 1030, the communication frame is received after a 0.5 ms propagation delay. Again, as indicated by the line 1035, the aircraft terminal transmits the RACH signal within the uplink sub-frames, but again the communication is delayed by another 0.5 ms on its transit to the ground terminal. Hence, there has been an overall delay of 1 ms, and this results in the RACH signal not falling within the RACH timing window, when using the timing adopted by the ground station 20, as indicated by the line 1040. Accordingly, as indicated by line 1045, the RACH signal has not been successfully received, and the ground station 20 will not send a response to the aircraft, as a result of which a communication link will not be established.

In accordance with the techniques described herein, this problem is addressed by enabling the vehicle terminal to assess the separation between it and the ground terminal with which it is seeking to establish a communication, and to apply an initial timing advance relative to the default time indicated for the RACH signal, when issuing that RACH signal to the ground terminal. This can be used to ensure that the RACH signal received within the specified timing window, hence enabling successful communication link to be established. This process is discussed in more detail with reference to the flow diagram of FIG. 5.

Figure 5:
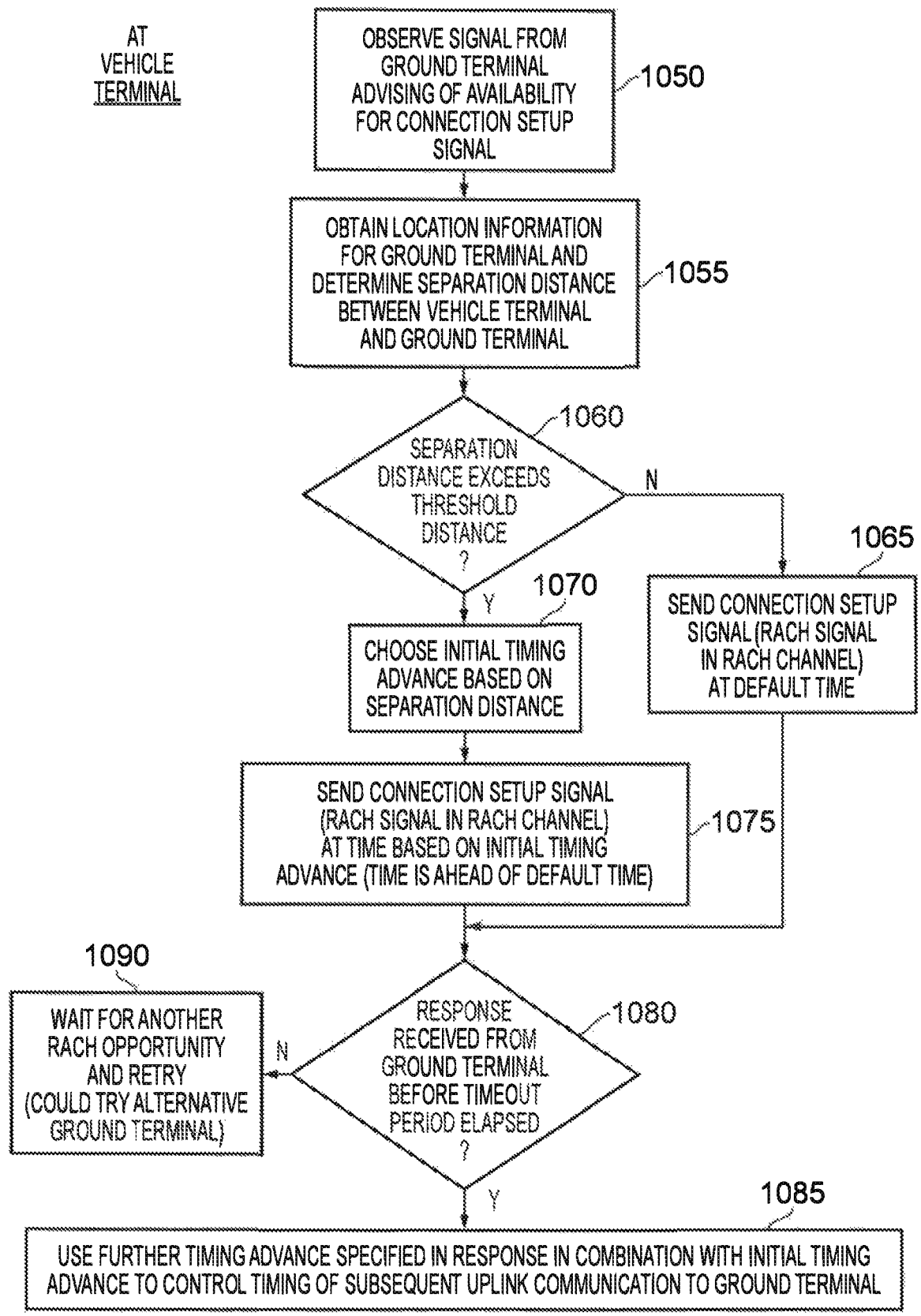
FIG. 5 is a flow diagram illustrating a process performed by the vehicle terminal in accordance with one example implementation, in order to ensure that the connection setup signal is successfully received by the ground terminal within an identified timing window even when the distance exceeds a setup threshold distance.

As shown in FIG. 5, at step 1050 the vehicle terminal 100 observes a signal from the ground terminal 130 advising of the availability for the issuance of a connection setup signal (a RACH signal). This information received by the vehicle terminal 100 also provides information about the default timing for issuing the RACH signal, the format of the RACH signal, and the format of the timing window.

At step 1055, the distance computation circuitry 120 obtains the location information for the ground terminal, and determines a separation distance between the vehicle terminal and the ground terminal. As discussed earlier, the distance computation circuitry 120 may refer to the storage 125 in order to obtain the coordinates of the ground terminal, based on that ground terminal's identifier included within the communication from the ground terminal, and can obtain information about the location of the vehicle terminal from the GPS receiver 115, hence enabling the separation distance to be determined.

At step 1060, it is determined whether the separation distance exceeds a setup threshold distance. If it does not, then the process proceeds to step 1065, where the connection setup signal is sent in the standard manner at the default timing, as per the process discussed for example earlier with reference to FIG. 4A. The setup threshold distance will depend on the RACH configuration used, i.e. the format of the RACH signal, and the size of the timing window, and the setup threshold distance will be determined not to have been exceeded if the separation distance is such that the RACH signal will be successfully received by the ground station if merely transmitted at the default timing specified by the signal received at step 1050.

However, if at step 1060 it is determined that the separation distance exceeds the setup threshold distance, then at step 1070 an initial timing advance is chosen based on that separation distance. There are a number of ways in which that initial timing advance can be determined, and one approach will be discussed later with reference to FIG. 8.

Once the initial timing advance has been determined at step 1070 then at step 1075 the RACH signal is sent in the RACH channel at a timing based on the initial timing advance. In particular, the default time is adjusted by the initial timing advance so that the RACH signal is issued ahead of the default time.

Due to the way in which the timing advance is chosen at step 1070, it will hence be ensured that the RACH signal will be received within the RACH timing window by the ground station 130 even though the separation distance exceeds the setup threshold distance.

Following either step 1065 or step 1075, the process proceeds to step 1080, where the vehicle terminal 100 waits to see if a response is received from the ground terminal before a timeout period has elapsed. In particular, even though the RACH signal will have been received within the required timing window, it is not guaranteed that the ground terminal will choose to establish a communication link with the vehicle terminal. For example, it may be that the vehicle terminal is contending with a number of other vehicle terminals to establish a communication link, and the ground terminal may choose to establish a communication link with one or more of those other vehicle terminals instead of the current vehicle terminal. For instance, certain vehicle terminals may be given priority over others, and hence it may be that the vehicle terminal being considered in FIG. 5 does not obtain a communication link at that time.

If the ground terminal chooses not to establish a communication link, it will not send a response back to the vehicle terminal, and accordingly if such a response is not received within a certain timeout period, the process proceeds to step 1090 where the vehicle terminal will wait to retry establishing a communication link.

It may be that at step 1090 the vehicle terminal waits for another RACH opportunity to be identified by the same ground terminal, and then retries establishing a communication link with that ground terminal. It could at that time take certain steps to increase the likelihood of it being allocated a communication link, such as for example increasing the power of the transmission so as to indicate to the ground terminal that a better quality communication link could be established. For example, in one implementation, the vehicle terminal estimates path loss and computes an initial RACH power for detection, selects a preamble from an available set of preambles and transmits it. If that RACH request is not successful, the vehicle terminal may autonomously choose another random preamble and increase its power for the next RACH opportunity. This can continue until the vehicle terminal's maximum transmit power has been reached.

However, the vehicle terminal is not limited to retrying to make a connection with the same ground terminal, and if it receives an initial signal from another ground terminal providing a connection setup opportunity, it could then seek to repeat the process of FIG. 5 in order to establish a link with that ground terminal.

If at step 1080 it is determined that a RACH response is received from the ground terminal, hence identifying that the ground terminal has accepted the establishment of a communication link with the vehicle terminal, then the communication control circuitry 110 within the vehicle terminal 100 will analyse the response in order to determine how to control subsequent communication with the ground terminal. In particular, a further timing advance may be specified in the response which should be used in combination with the initial (coarse) timing advance chosen at step 1070 to control the timing of subsequent uplink communication to the ground terminal. In addition, the response will typically provide information about which sub-frames are allocated to the vehicle terminal for downlink and uplink communications, so that the vehicle terminal can receive downlink communications destined for it as issued by the ground terminal 130, but can also issue its uplink communications within an appropriate sub-frame, using the cumulative timing advance determined at step 1085 so as to ensure that those uplink communications are received at the appropriate timing by the ground terminal 130.

It should be noted that while the information in the RACH response is used to provide a fine timing advance that can be combined with the coarse timing advance to determine the actual timing advance to be used for a subsequent uplink communication, as time progresses after the communication link has been established the distance between the aircraft and the ground terminal will change. This change can be compensated for using standard techniques provided by the 4G (LTE) Standard to make fine timing adjustments during the duration of the communications link.

Figure 6A:
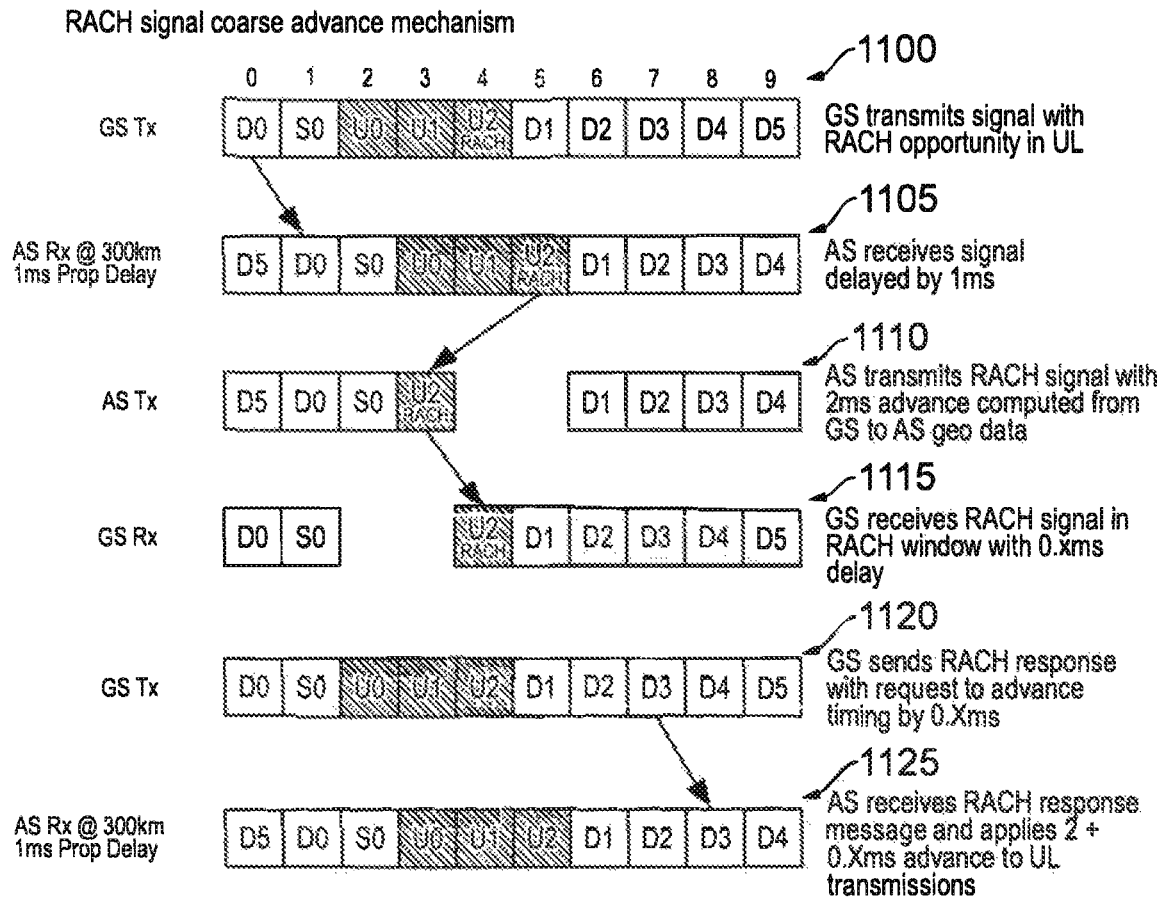
FIGS. 6A and 6B illustrate how the approach described in FIG. 5 ensures correct reception of the connection setup signal, and enables the provision of a suitable response from the ground terminal that allows a correct timing advance to be applied for future uplink communication to the ground terminal.

FIG. 6A illustrates how the process of FIG. 5 is applied for a particular implementation of the RACH signal and RACH timing window. In this example, it assumed that the RACH timing window is specified as coinciding with the third uplink communication sub-frame (U2), and that the RACH signal as transmitted will need to land entirely within that sub-frame in order for a successful communication to be established. As indicated by the line 1100, the ground station transmits a signal identifying the RACH opportunity that can be used within the uplink path. As indicated by the line 1105, due to the separation between the ground terminal 130 and the vehicle terminal 100, which in this case is assumed to be the maximum allowable distance of 300 km, the vehicle terminal 100 receives the communication frame delayed by 1ms, and hence the communication frame is offset by a sub-frame width.

As indicated by the line 1110, because the separation distance exceeds the setup threshold distance at step 1060, an initial timing advance is chosen at step 1070 based on the separation distance, and in this case that initial timing advance will be chosen to be 2 ms. A full 2 ms advance can be applied without risk of violating a receive/transmit timing constraint, since even when the RACH signal is advanced by 2 ms, the vehicle terminal is not seeking to transmit that RACH signal at a time when it should be configured for receiving downlink communication, as is evident by the line 1110.

As indicated by the line 1115, that RACH signal will then actually be received with a 1 ms delay relative to its transmission time, which then realigns the RACH signal with the RACH timing window. Accordingly, the connection setup signal (the RACH signal) will be received, and accordingly a communication link can be established.

Assuming the ground terminal determines that a communication link is to be established with the vehicle terminal, then it will transmit a communication frame 1120 as a RACH response, which will be received with a 1 ms delay, as indicated by the line 1125. This can specify a fine timing advance if needed, which can be applied in combination with the coarse timing advance applied by the vehicle terminal to control subsequent uplink communications. The RACH response will also typically provide an indication of which sub-frames are allocated to the vehicle terminal for subsequent downlink and uplink communications.

Figure 6B:
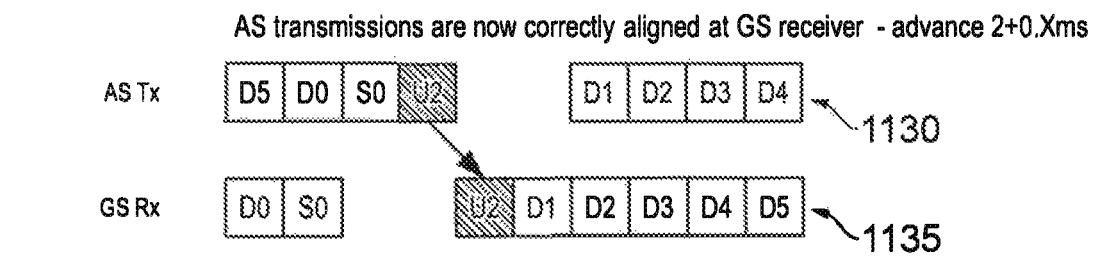

As indicated in FIG. 6B, it is assumed in this instance that the vehicle terminal is allocated as its uplink sub-frame the sub-frame U2, and will accordingly perform an uplink transmission at a timing indicated by the line 1130 for its subsequent uplink communications. As indicated by the line 1135 in FIG. 6B, due to the timing advance applied, this will ensure that the uplink communication is actually received at the correct timing by the ground terminal 130.

It should be noted that whilst in FIG. 6A it is assumed that the RACH configuration specifies that the RACH timing window is associated with the U2 sub-frame, as discussed earlier different RACH configurations can be used. For example, a RACH configuration may be used where the timing window is associated with both the U1 and the U2 sub-frames, with a longer RACH signal being issued, but with the requirement that a RACH signal lands in its entirety within the U1 and U2 sub-frames as per the timing adopted by the ground terminal 130. In another example, the RACH configuration may specify the use of all three uplink sub-frames as the RACH timing window, again with a longer RACH signal, but again with the requirement that that RACH signal lands entirely within the timing window as per the timing adopted by the ground terminal 130. The choice of RACH configuration will affect the setup threshold distance that is assessed at step 1060 of FIG. 5, and may affect the initial timing advance that is then chosen at step 1070 in situations where the distance exceeds the setup threshold distance.

For instance, whilst in the example of FIG. 6A the initial timing advance chosen based on the separation distance does not have to be constrained to take into account the requirement not to violate a receive/transmit timing constraint, with other RACH configurations the initial timing advance chosen may need to be constrained so as to ensure that the receive/transmit timing constraint is not violated. For example, it will be appreciated that if the RACH timing window occupies both the U1 and the U2 sub-frames, and a 2 ms advance was applied as per the example shown in FIG. 6A based on a separation distance of 300 km, this means that the transmission of the RACH signal will overlap with the SO sub-frame. However, the receive/transmit timing constraint would then be violated if such an advance resulted in the need to transmit an uplink signal whilst the antenna system 105 should still be configured for downlink communication. In addition to the fact that it takes a finite time to perform the switch, as mentioned earlier it is also possible that some of the first symbols within the SO sub-frame may be used for downlink communication, and accordingly in that instance it may not be appropriate to fully advance the initial timing by the timing that would be determined based purely on the propagation delay. Instead, it may be necessary to choose a slightly smaller coarse timing advance to avoid violating the receive/transmit timing constraint, whilst ensuring that that timing advance is sufficient to cause the RACH signal to be received within the RACH timing window. The further timing advance determined by the ground terminal will then compensate for the initial timing advance, so that cumulatively the initial and further timing advances will provide the required timing advance for subsequent uplink communication.

Figure 7:
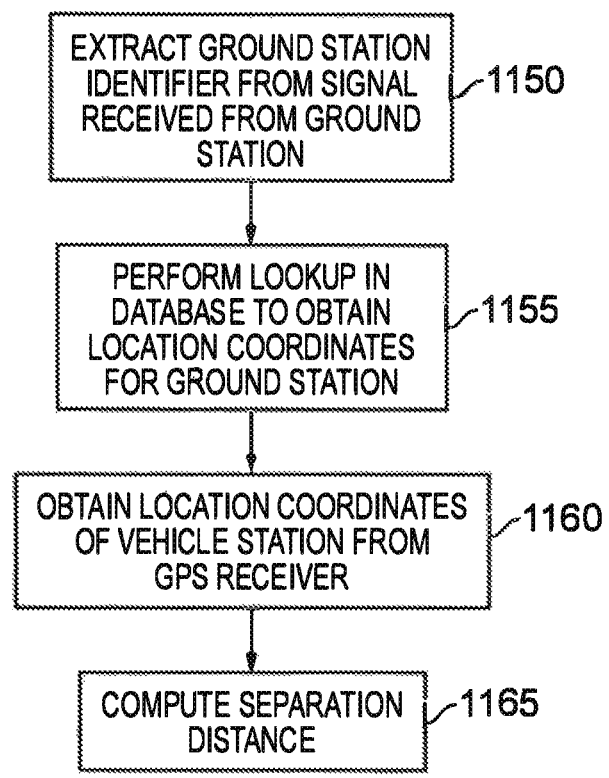
FIG. 7 is a flow diagram illustrating how step 1055 of FIG. 5 may be performed in accordance with one example implementation.

FIG. 7 is a flow diagram illustrating one way in which step 1055 of FIG. 5 may be performed. In this example, it is assumed that the initial communication from the ground station includes a ground station identifier. At step 1150, the distance computation circuitry 120 extracts that ground station identifier from the received signal, and then at step 1155 performs a lookup in the database provided within the storage 125 in order to obtain the location coordinates for the ground station.

At step 1160, the distance computation circuitry 120 then obtains location coordinates of the vehicle terminal 100 from the GPS receiver 115, and thereafter at step 1165 computes the separation distance between the ground terminal and the vehicle terminal.

Whilst the approach of FIG. 7 can be used in one example implementation, in an alternative implementation it may be that the initial signal from the ground terminal directly provided the coordinates of the ground terminal, and accordingly those coordinates could be extracted from the received signal at step 1150, and no lookup in the database would be required (hence step 1155 becoming redundant).

Figure 8:
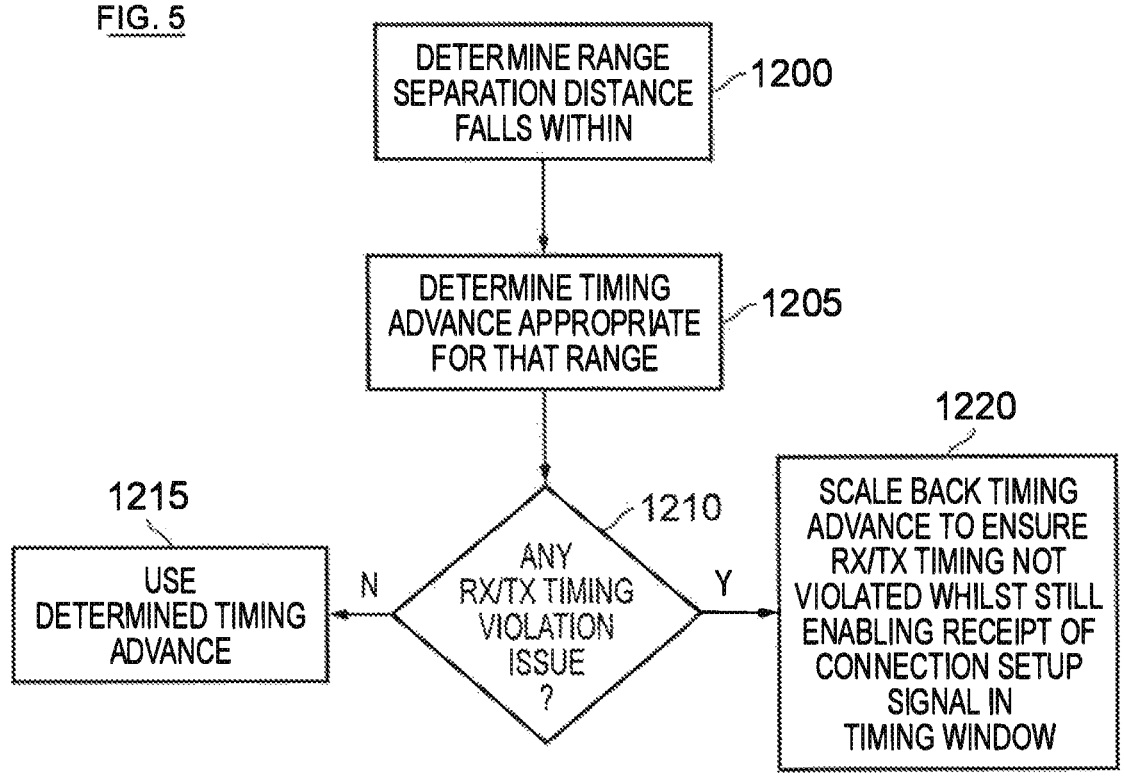
FIG. 8 is a flow diagram illustrating how step 1070 of FIG. 5 may be performed in one example implementation.

FIG. 8 is a flow diagram illustrating how step 1070 of FIG. 5 may be performed in one example implementation. At step 1200, it is determined which range of separation distances the separation distance falls within. Then, at step 1205 a timing advance appropriate for that range is determined. For instance, it could be that a lookup table is used that provides suitable coarse timing advances to be used for each of a number of different ranges. That lookup table could provide timing advances applicable for a number of different RACH configurations (i.e. for different formats of RACH signal and RACH timing window), with the lookup operation obtaining the timing advance appropriate for the determined range and RACH configuration.

However, in some implementations it may be determined that a lookup table approach based on ranges is not required, and instead the separation distance may be determined on the fly. In particular, an initial timing advance can be determined by dividing the separation distance by the speed of light.

As shown in FIG. 8, the process then proceeds to step 1210, where it is determined whether there is any receive/transmit timing violation issue. As discussed earlier, this may depend on the RACH configuration used and the separation distance in question. In particular, for RACH configurations that use multiple sub-frames, it may be the case that when the separation distance exceeds a certain amount, then there could be a receive/transmit timing violation issue if the timing advance determined at step 1205 was used "as is".

If it is determined that there is not any receive/transmit timing violation issue, then the process proceeds to step 1215 where the determined timing advance evaluated at step 1205 is used However, if it is determined that there is a receive/transmit timing violation issue, then at step 1220 the timing advance can be scaled back to ensure that the receive/transmit timing constraint is not violated, whilst still enabling receipt of the connection setup signal within the timing window.

In instances where the timing advance is encoded within a lookup table based on ranges of separation distance, then as mentioned earlier in one example implementation that lookup table will provide timing advance information for each of a number of different possible RACH configurations, and the prospect of violating receive/transmit timing constraints can be taken into account when populating the lookup table, so that in effect the evaluation at step 1210 is taken into account when initially populating the lookup table. In that event it will merely be sufficient to determine the range that the separation distance falls within and then obtain the appropriate timing advance to use from the lookup table at step 1205. Hence, in that case steps 1210, 1215 and 1210 would not be needed.

In one example implementation, when determining the appropriate timing advance to use, the aim is to try and land the connection setup signal within the middle of the specified timing window. By such an approach, this can allow for any inaccuracy in the timing advance applied, to ensure not only that the entire connection setup signal is received before the end of the timing window, but also that no portion of that connection setup signal is received before the start of the timing window.

It should be noted that the above coarse timing advance scheme can be applied to a wide variety of different communication schemes, for instance both TDD (time division duplex) and FDD (frequency division duplex) schemes. When employing an FDD scheme, the above-mentioned receive/transmit timing constraint issue may not apply as the antenna system can transmit and receive simultaneously, and hence steps 1210 and 1220 of FIG. 8 will not be employed.

Figure 9:
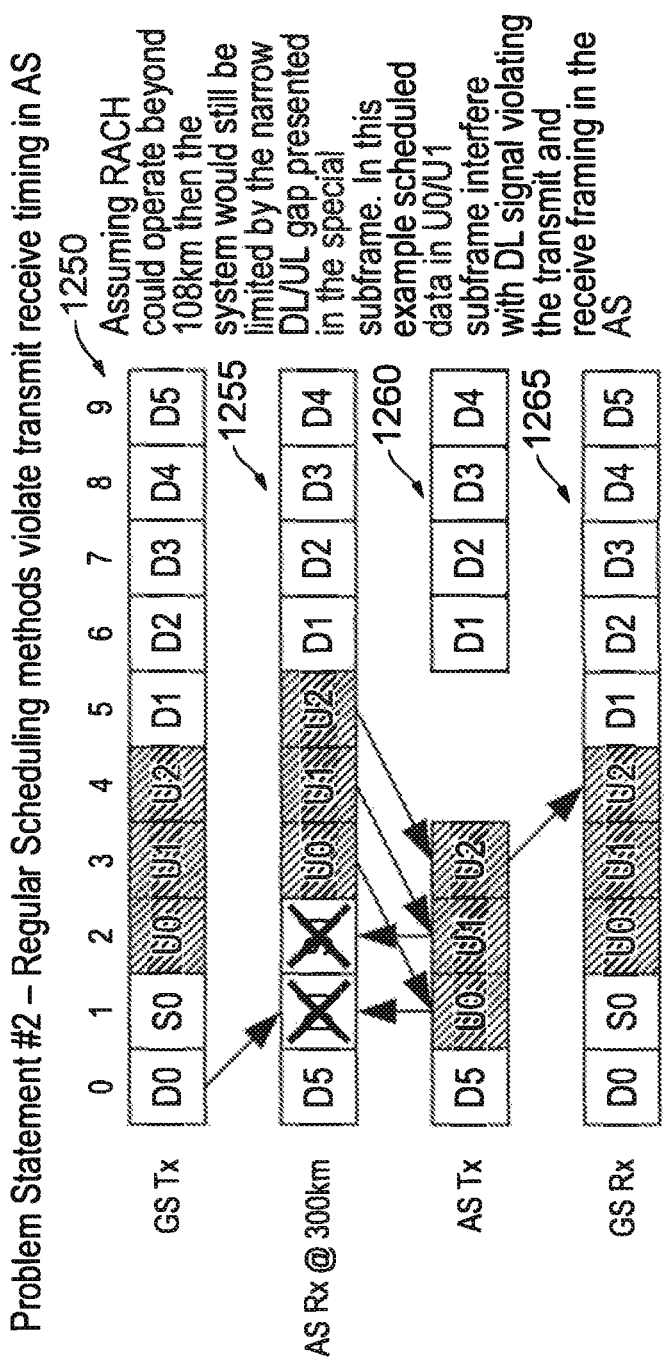
FIG. 9 is a diagram schematically illustrating a scheduling issue that can arise when the vehicle terminal is separated from the ground terminal by a distance exceeding a scheduling threshold distance.

Using the above described techniques, it is possible to establish a communication link with the ground terminal, even in situations where the separation distance between the aircraft 10 and the ground terminal 20 exceeds that supported using the standard RACH mechanism. However, as illustrated schematically in FIG. 9, a further problem that can arise is ensuring that in the subsequent uplink communications from the aircraft to the ground station 10 (using the cumulative timing advance obtained by combining the initial timing advance chosen by the vehicle terminal 100 with the fine timing advance specified in the RACH response), the earlier-mentioned receive/transmit timing constraint is not violated. In particular, as shown in FIG. 9, the communication frame format provides multiple sub-frames that can in principle be used for uplink communication, namely the sub-frames U0, U1 and U2 shown in the communication frame 1250. However, as indicated by the combination of the lines 1255 and 1260, if the scheduling circuitry 140 within the ground terminal 130 chooses to allocate resource blocks to the aircraft 10 within either the U0 or the U1 sub-frames, then if the aircraft separation distance from the ground terminal exceeds a scheduling threshold distance (in this example the scheduling threshold distance being 100 km), then the receive/transmit timing constraint would be violated.

In the example of FIG. 9, it is assumed that the separation distance between the aircraft 10 and the ground terminal 20 is 300 km, and hence from the earlier discussed FIG. 6A it will be understood that a timing advance of approximately 2 ms may be specified. However, this would overlap the sub-frames U0 and U1 with the downlink sub-frame D0 and the special sub-frame S0, and as discussed earlier the special sub-frame S0 may include some symbols transmitting downlink information. At any point in time, the antenna system 105 can only be configured for downlink communication or uplink communication, so this would violate the receive/transmit timing constraint, even though, as indicated by the line 1265, that timing advance would correctly align the uplink communications so that they are received in the relevant sub-frames U0, U1, U2 as per the timing employed by the ground terminal 130.

Figure 10A:
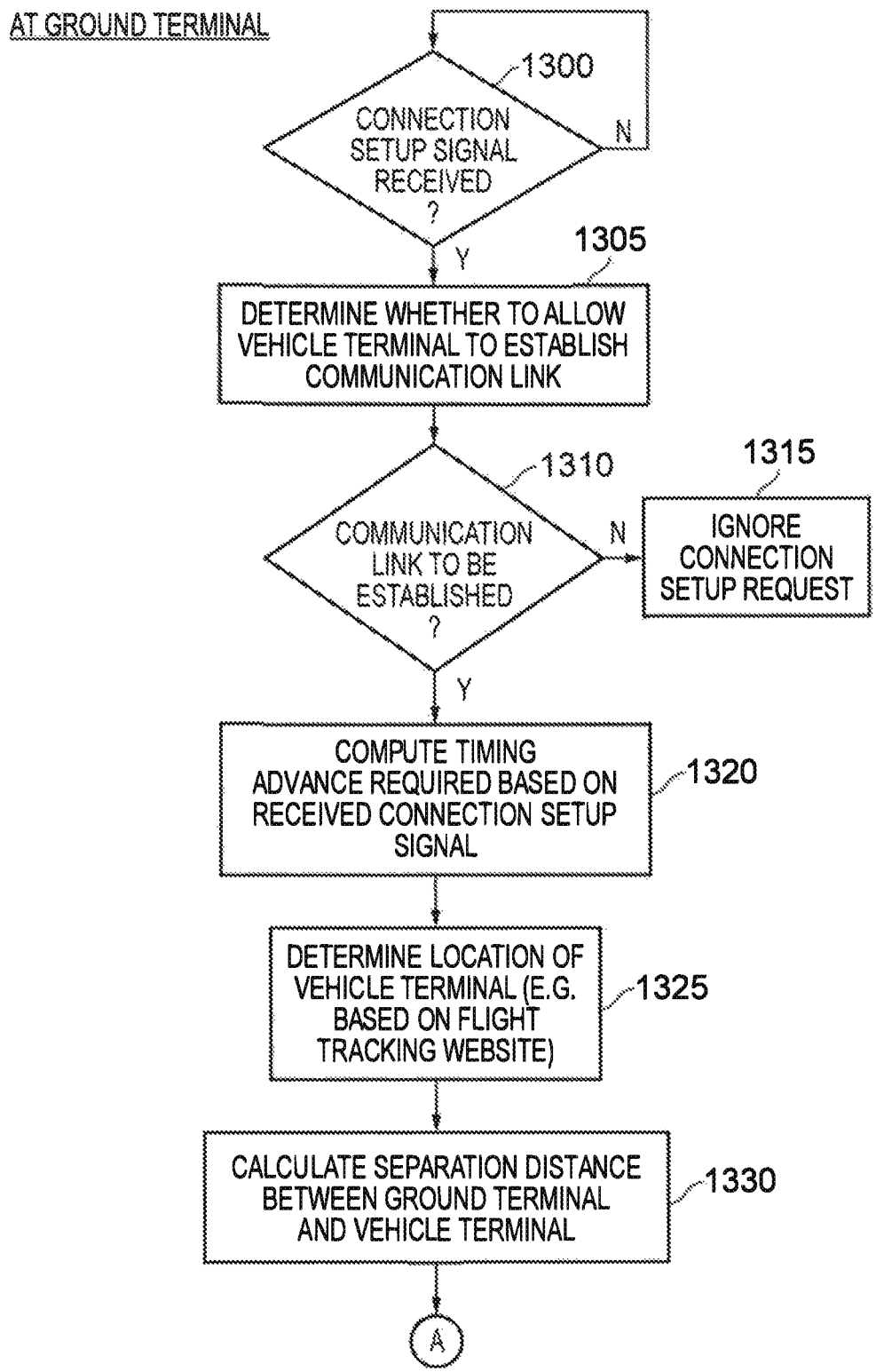
FIGS. 10A and 10B are a flow diagram illustrating a process performed by the ground terminal in order to resolve the scheduling issue illustrated in FIG. 9, in accordance with one example arrangement.
Figure 10B:
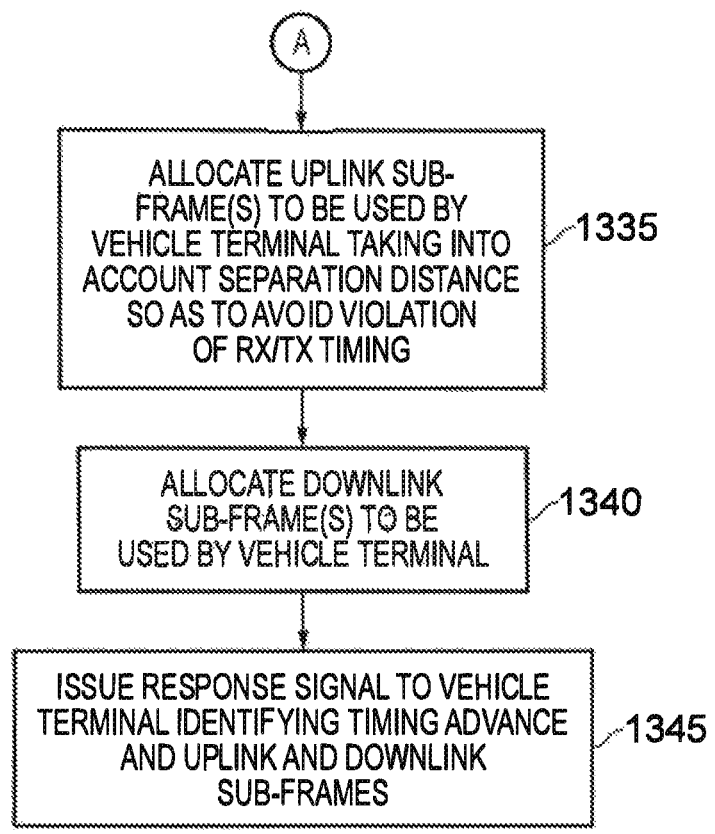

FIGS. 10A and 10B provide a flow diagram illustrating steps that can be performed by the ground terminal when determining how to schedule sub-frames to the vehicle terminal, in order to resolve the issue illustrated in FIG. 9. At step 1300, the ground terminal will await receipt of a connection setup signal, i.e. the earlier discussed RACH signal, from the vehicle terminal. Then, at step 1305 the ground terminal determines whether to allow the vehicle terminal 100 to establish a communication link with it. As discussed earlier, a number of criteria can be assessed here. For example, the quality of the communication link can be assessed, and factors such as other vehicle terminals that are seeking to establish a communication link can be considered when deciding whether to accept the establishment of a communication link with the vehicle terminal 100.

At step 1310, it is then concluded whether a communication link is to be established or not, and if not then at step 1315 the connection setup request is merely ignored. As will be apparent from the earlier discussed FIG. 5, this will result in no response being received by the vehicle terminal within a specified timeout period, and accordingly the vehicle terminal will proceed to step 1090 in order to seek to establish a communication link at a future time, either with that ground terminal 130, or with another ground terminal.

Assuming it is decided at step 1310 that a communication link is to be established, then at step 1320 the communication link establishing and scheduling circuitry 140 computes a timing advance required based on the received connection setup signal. In particular, based on the placement of the received RACH signal within the RACH timing window, a timing advance can be computed, this being the fine timing advance discussed earlier. At this stage, the computation performed by the communication link establishing and scheduling circuitry 140 does not need to take account of the actual separation distance between the aircraft and the ground terminal, since as discussed earlier that fine timing advance will be combined with any coarse timing advance initially chosen by the aircraft when sending the RACH signal, in order to determine the full timing advance to be used for subsequent uplink communication.

However, as discussed earlier care needs to be taken when scheduling uplink sub-frames for the aircraft to ensure that the receive/transmit timing constraint is not violated, and to assist in this process the ground terminal 130 does need to determine the separation between the vehicle terminal 100 and the ground terminal.

Accordingly, at step 1325 the ground terminal is arranged to determine the location of the vehicle terminal. In particular, the distance computation circuitry 145 discussed earlier in FIG. 3 can access information in order to determine the current position of the aircraft 10. There are a number of ways in which the vehicle location information can be obtained, but in one example a flight tracking website may be accessed in order to obtain current coordinate information. Thereafter, at step 1330 the separation distance between the ground terminal and the vehicle can be determined. In particular, the location of the ground terminal 130 will be fixed, and accordingly can be used when computing the separation distance.

Then, at step 1335, one or more uplink sub-frames are allocated for use by the vehicle terminal taking into account the separation distance, so as to avoid violation of the receive/transmit timing constraint. In particular, in one example arrangement there may be multiple sub-frames that can be allocated for uplink communication, such as the three sub-frames U0, U1, U2 discussed earlier. Which of those sub-frames is used when allocating uplink resource for the aircraft 10 can take account of the separation distance. This will be discussed in more detail later by way of example with reference to FIGS. 11A to 11C, However, from the earlier-discussed FIG. 9, it will be appreciated that in the particular example chosen in FIG. 9 the scheduling circuitry could avoid allocating resource blocks within the sub-frames U0 and U1, so that the aircraft is only allocated resource blocks within the sub-frame U2, such that when the timing advance is applied the receive/transmit timing constraint will not be violated.

As indicated at step 1340, downlink sub-frames are also allocated to be used by the vehicle terminal for downlink communication from the ground station to the aircraft.

Once the uplink and downlink sub-frames have been allocated, then the response signal can be issued to the vehicle terminal at step 1345 identifying both the timing advance determined earlier at step 1320, and the uplink and downlink sub-frames that are to be used for subsequent communication with the aircraft.

Figure 11A:
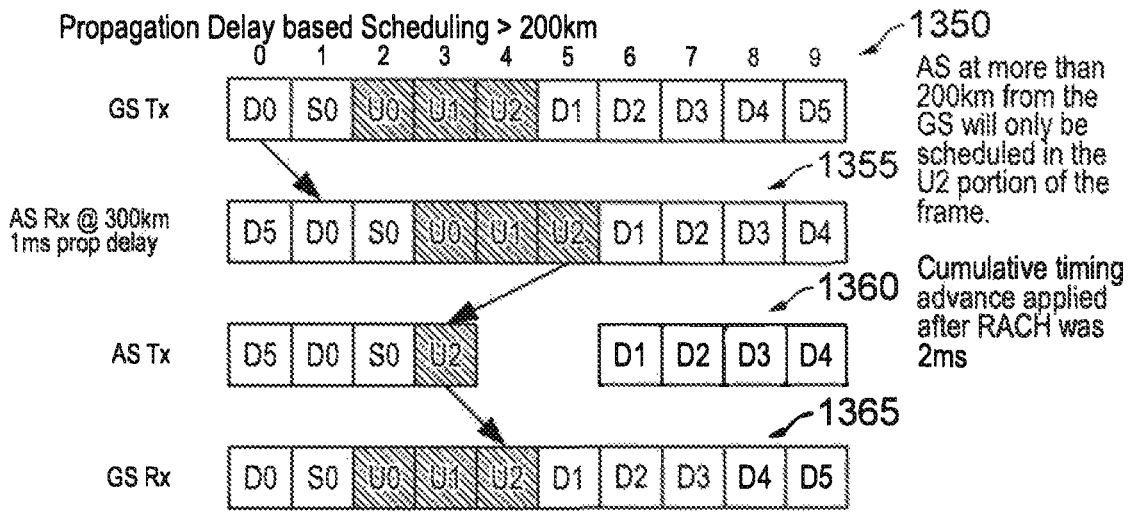
FIGS. 11A to 11C illustrate how the process of FIGS. 10A and 10B may be applied for various separation distances between the vehicle terminal and the ground terminal, in accordance with one example arrangement.
Figure 11B:
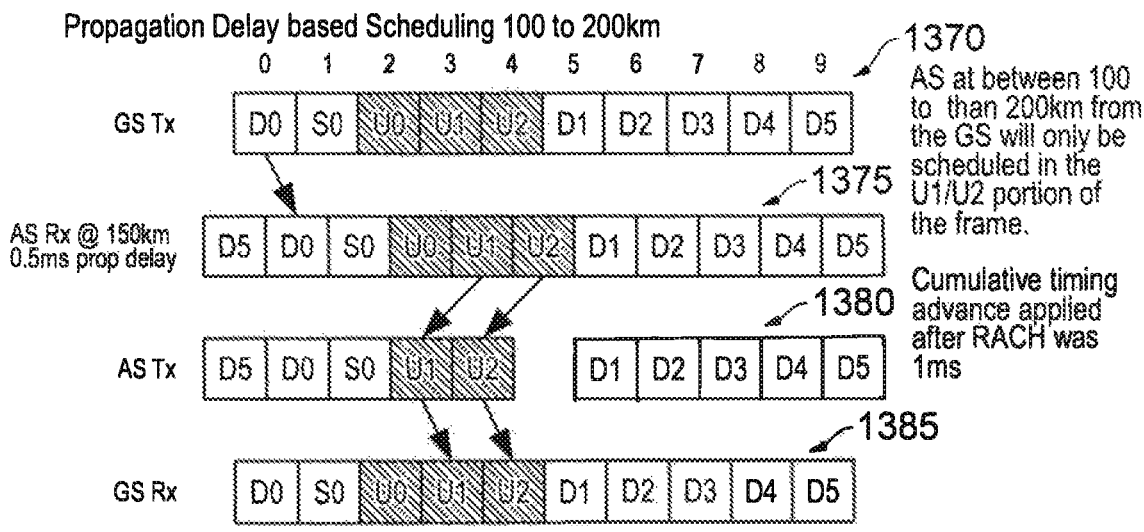
Figure 11C:
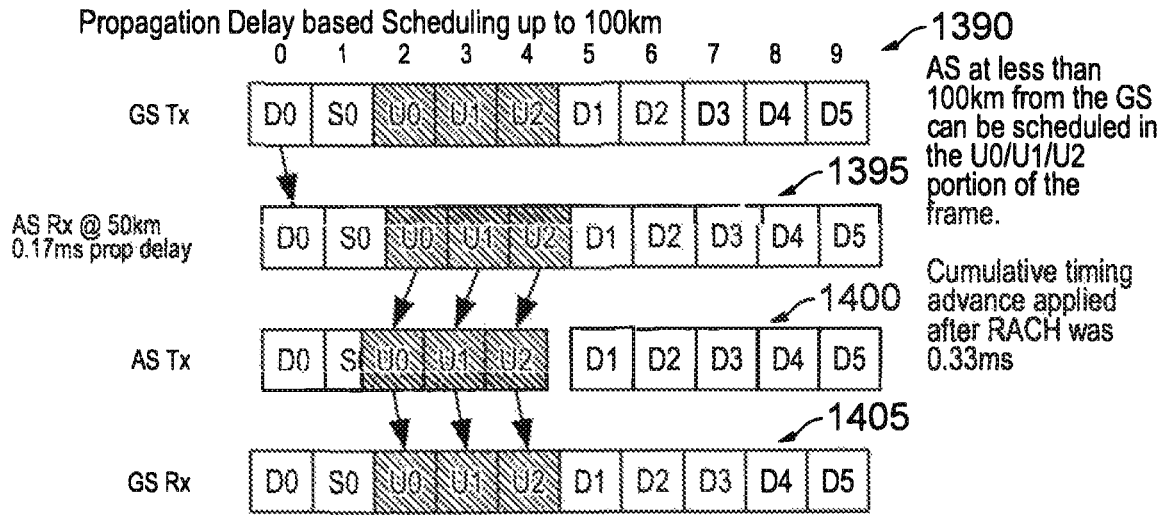

FIGS. 11A to 11C illustrate how uplink resource can be scheduled, assuming the communication frame format is as discussed earlier in FIG. 2, and accordingly there are three sub-frames that can in principle be used for uplink communication. As indicated in FIG. 11A, where it is determined that the aircraft 10 is at 300 km from the relevant ground terminal 20, the propagation delay is 1 ms, and accordingly the communication frame 1350 as transmitted by the ground terminal is received as shown by the line 1355, such that the communication is one sub-frame out relative to the transmission timing. In this example, it is assumed that the scheduling circuitry determines at step 1335 to allocate the U2 sub-frame to the vehicle terminal for use in uplink communication. As a result, as indicated by the line 1360, when the cumulative timing advance of 2 ms is applied, the downlink/uplink timing constraint is not violated. Hence, the uplink communication can be performed using this timing advance, and will ensure that it is correctly received by the ground terminal in the U2 sub-frame, as indicated by the line 1365. The approach shown in FIG. 11A can be used wherever the separation distance exceeds 200 km, provided the separation distance does not exceed 300 km.

FIG. 11B illustrates a scheduling approach that can be used when the separation distance is between 100 and 200 km. Again, the communication frame 1370 is transmitted from the ground terminal 20, and in this specific example it is assumed that the separation is 150 km, and hence the delay in receiving the communication frame is 0.5 ms as shown by the line 1375. In this scenario, the cumulative timing advance that will applied after the RACH sign-up process has been completed will be 1 ms. As a result, it is possible to accommodate uplink allocations in either or both of sub-frames U1 and U2 without violating the downlink/uplink timing constraint, as indicated by the line 1380. As shown by the line 1385, uplink communications in either of those two sub-frames will then be correctly received by the ground terminal 20.

FIG. 11C illustrates a scheduling scheme that can be used when the separation distance is less than 100 km. The communication frame 1390 is transmitted from the ground terminal, and in this instance it is assumed that the separation delay is 0.17 ms, this assuming the separation distance is 50 km. In this instance, any of the three uplink sub-frames U0, U1 or U2 can be allocated for uplink communication, since the cumulative timing advance after the RAH process has been performed will be 0.33 ms.

As shown by the line 1400, if the sub-frame U0 is used, this will cause some overlap of the U0 sub-frame transmission timing with the SO frame. However, the extent of overlap still leaves some gap, and in particular does not overlap with any symbols within the SO sub-frame that will be used for downlink communication, and accordingly the receive/transmit timing constraint is not violated. Further, as shown by the line 1405, any uplink communication of the three sub-frames U0, U1 or U2 will be correctly received by the ground terminal with the appropriate timing.

It is anticipated that the traffic between an aircraft and a connected ground terminal will be heavily downlink centric, for example to support the earlier-mentioned Wi-Fi connectivity for passengers within the aircraft. As will be apparent from the earlier-discussed frame format of FIG. 2, when using that frame format three sub-frames are reserved for uplink communication. This is required to allow for effective scheduling of uplink communications for aircrafts up to 300 km away from the ground terminal. However, in one example implementation the base station may be provided with the flexibility to alter the communication frame format under certain conditions, in order to allow for a larger proportion of the communication frame to be used for downlink traffic when possible.

Figure 12:
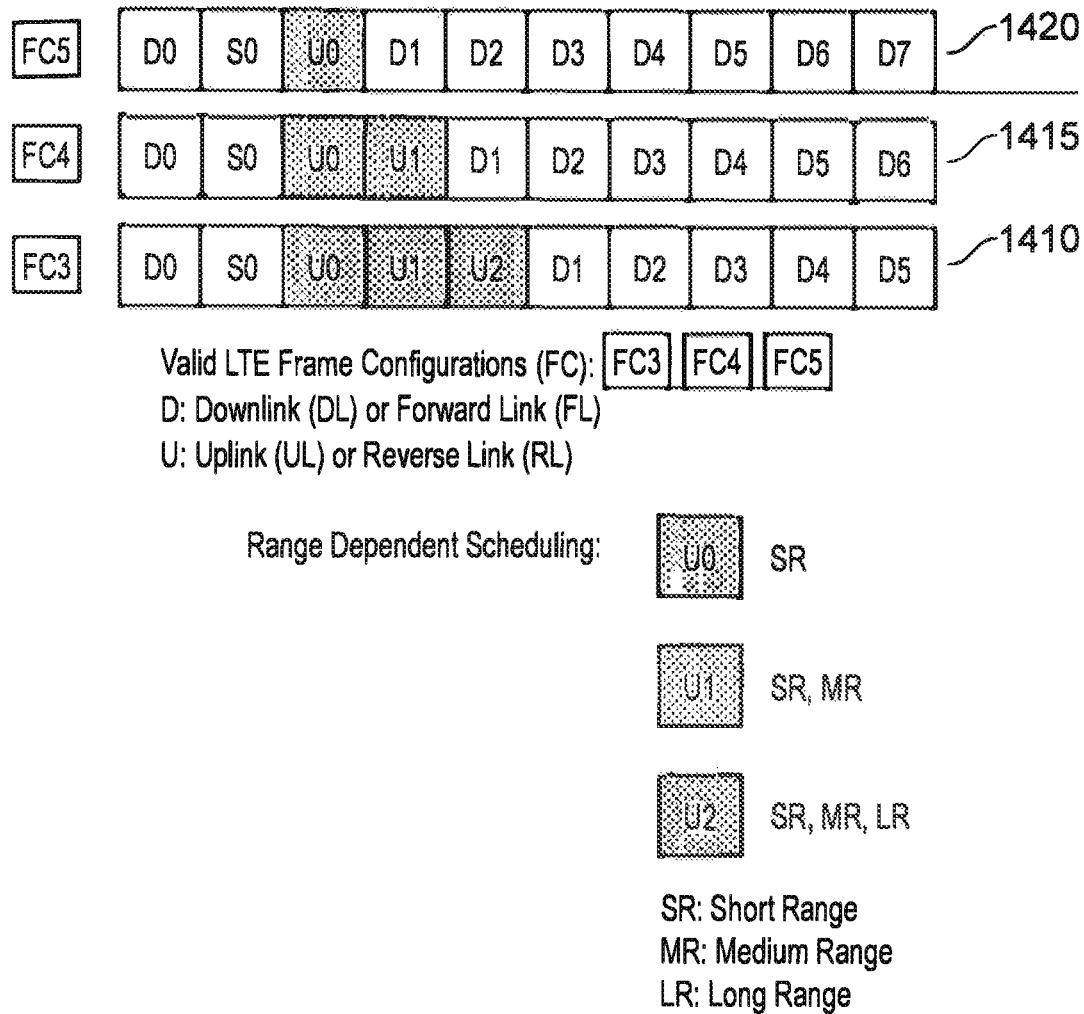
FIG. 12 illustrates multiple communication frame formats that can be supported in one example implementation.

FIG. 12 illustrates three example communication frame formats that may be used, each of which are supported LIE TDD (Time Division Duplex) frames. The frame format FC3 1410 is the format discussed earlier with reference to FIG. 2. The format FC4 1415 has one less uplink sub-frame and one more downlink sub-frame. Further, the frame format FC5 1420 has only a single uplink sub-frame, and an additional downlink sub-frame relative to the frame format FC4.

From the earlier scheduling examples illustrated with reference to FIGS. 11A to 11C, it will be appreciated that it is only when the separation distance exceeds 200 km (referred to in FIG. 12 as long range (LR)) that there is a need to schedule uplink communication in the last of the three uplink sub-frames, and hence the requirement to use communication frame FC3, When the distance is between 100 and 200 km (referred to in FIG. 12 as medium range (MR)), then uplink communication can be scheduled in the second uplink sub-frame, and hence it would still be possible to schedule uplink communications even if the communication frame format FC4 was used. Similarly, it will also be appreciated that if the communication frame format FC4 is used, uplink communication with aircraft up to 100 km away (referred to in FIG. 12 as short range (SR)) can also be accommodated when using the communication frame format FC4.

Finally, it will be appreciated that if the aircraft is less than 100 km away, then the communication frame format FC5 could be used, since uplink communication can be scheduled in the first uplink sub-frame (which happens to be the only uplink sub-frame in the frame format FC5).

Figure 13:
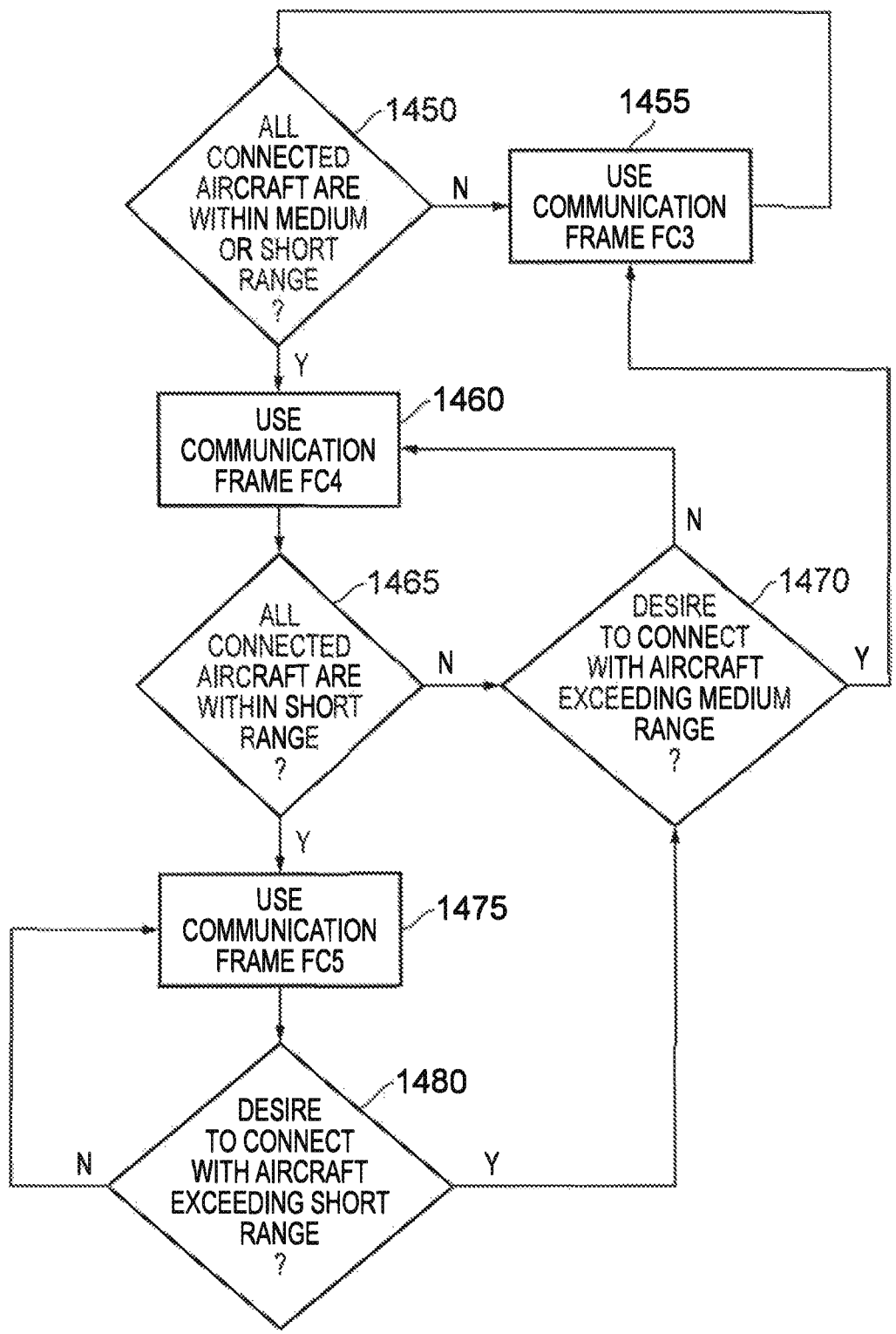
FIG. 13 is a flow diagram illustrating how the ground terminal in one example implementation can switch between the communication frame formats of FIG. 12. as separation distances permit, in order to seek to increase the proportion of the communication frame available for downlink communications.

FIG. 13 is a flow diagram illustrating how the ground terminal could make use of the three communication frame formats shown in FIG. 12 in order to facilitate a higher downlink capacity when the location of the connected aircrafts permits. At step 1450, it is determined whether all of the aircraft connected to that ground station are within the medium or short ranges. If not, then the communication frame FC3 is used at step 1455, and the process returns to step 1450.

However, if all of the connected aircraft are within the medium or short range, then the process can proceed to step 1460 where the aircraft terminal can switch to using communication frame FC4. A broadcast signal can be sent from the ground terminal to all of the connected aircraft terminals to advise them of the change in the communication frame. Once step 1460 has been implemented, it will be appreciated that there is an additional downlink sub-frame available when compared with the communication frame FC3.

Following step 1460, it can be determined at step 1465 whether all connected aircraft are within the short range. If not, it is then determined at step 1470 whether there is a desire to connect with an aircraft exceeding the medium range. For example, the ground terminal may receive a RACH signal from an aircraft within the long range seeking to establish a connection, and the ground terminal may decide that it wishes to service that request. Alternatively, it may be known that one of the already connected aircraft is about to leave the medium range into the long range, and it may be desirable to maintain connection with that aircraft. If it is determined at step 1470 that there is desire to connect with an aircraft exceeding the medium range, then the process proceeds to step 1455 where a switch is made to using the communication frame FC3.

Again, a broadcast signal can be sent from the ground station to identify this change in the communication frame.

However, if at step 1470 it is determined that there is no desire to connect with an aircraft exceeding the medium range, then the process can merely return to step 1460.

If at step 1465 it is determined that all of the connected aircraft are within the short range, then the process can proceed to step 1475 where the communication frame FC5 can be used. Again, a broadcast signal can be sent from the ground terminal to advise of the change in the communication frame format.

Following step 1475, it can be determined at step 1480 whether there is a desire to connect with an aircraft exceeding the short range. If not, the process merely returns to step 1475 where the communication frame format FC5 continues to be used. However, if at step 1480 it is determined that there is a desire to connect with an aircraft exceeding the short range, then the process proceeds to step 1470 where the earlier-discussed analysis is performed.

Accordingly, by such an approach, it can be seen that the ground terminal can make use of multiple communication frame formats so as to seek to maximum the downlink capacity available, taking into account the separation between that ground terminal and the relevant aircraft. This can further improve capacity within the network.

In one example implementation where lookup tables are used to determine initial timing advances to be applied for RACH signals, those lookup tables can be updated as necessary dependent on the communication frame format currently being employed by the ground terminal.

From the above described examples, it will be seen that the techniques described herein enable for a timing adjustment to be made within a wireless communication system for a moving vehicle to enable wireless links to be established between the moving vehicle and a ground terminal, even when the separation distance between the moving vehicle and the ground terminal exceeds the maximum separation distance supported by the sign-on procedure when using the wireless communication Standard provided within the wireless network. Further, once such a link has been established, the scheduling of uplink resource to the aircraft can be adapted so as to ensure that receive/transmit timing constraints are not violated, even in situations where the separation distance exceeds the maximum separation distance supported by the telecommunications Standard.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A wireless communication system for a moving vehicle, comprising:
   an antenna system to communicate with a further antenna system;
   communication control circuitry to perform a sign-on procedure to seek to establish a communication link with the further antenna system, during which the communication control circuitry is arranged to issue via the antenna system, a connection setup signal for receipt by the further antenna system within an identified timing window;
   location specifying circuitry to identify a current location of the wireless communication system; and
   distance computation circuitry to obtain location information specifying a location of the further antenna system and to determine a separation distance between the antenna system and the further antenna system, wherein:
   the communication control circuitry is arranged to issue the connection setup signal at a default time unless the separation distance exceeds a setup threshold distance that indicates that use of the default time would prevent the connection setup signal being received within the identified timing window, in which event the communication control circuitry is arranged to apply a timing advance in order to issue the connection setup signal prior to the default time so as to cause the connection setup signal to be received by the further antenna system within the identified timing window;

when a communication link is established between the antenna system and the further antenna system, the antenna system receives a response signal identifying a further timing advance;

the communication control circuitry is arranged, when the connection setup signal was issued by applying the timing advance to use both the timing advance and the further timing advance to control timing of a subsequent uplink communication to the further antenna system;

communications between the antenna system and the further antenna system occur within communication frames;

the further antenna system controls allocation of sub-frames within each communication frame, and when a communication link is established between the antenna system and the further antenna system, the response signal received by the antenna system further identifies the sub-frames allocated for uplink and downlink communication between the antenna system and the further antenna system; and each sub-frame allocated to the antenna system for uplink communication is chosen by the further antenna system based on the separation distance, such that a receive/transmit timing constraint will not be violated when both the timing advance and the further timing advance are used to control timing of a subsequent uplink communication to the further antenna system, wherein a number of sub-frames in multiple sub-frames that can be allocated for uplink communication is dependent on a maximum supported separation distance between the antenna system and the further antenna system.

2. A wireless communication system as claimed in claim 1, wherein an amount of the timing advance is dependent on the separation distance.

3. A wireless communication system as claimed in claim 2, wherein the communication control circuitry is arranged to determine the amount of the timing advance dependent on which of a plurality of ranges of separation distance the separation distance falls within.

4. A wireless communication system as claimed in claim 2, wherein the communication control circuitry is arranged to limit the amount of the timing advance so as to ensure that a receive/transmit timing constraint is not violated.

5. A wireless communication system as claimed in claim 4, wherein:
the antenna system is unable to transmit and receive signals simultaneously; and
the receive/transmit timing constraint requires the antenna system to remain configured for reception during any portion of a communication frame where the antenna system may receive a downlink signal from the further antenna system.

6. A wireless communication system as claimed in claim 1, wherein the default time is a time relative to a start of a communication frame.

7. A wireless communication system as claimed in claim 6, wherein each communication frame comprises a plurality of sub-frames, and the identified timing window comprises one or more sub-frames.

8. A wireless communication system as claimed in claim 1, wherein each allocated sub-frame identified in the response signal for uplink communication resides within a chosen group of the multiple sub-frames, where the chosen group is dependent on which of a plurality of ranges of separation distance the separation distance falls within.

9. A wireless communication system as claimed in claim 8, where the chosen group is such that at least a first sub-frame in the multiple sub-frames is excluded from allocation when the separation distance exceeds a scheduling threshold distance.

10. A wireless communication system as claimed in claim 1, wherein the multiple sub-frames that can be allocated for uplink communication are consecutive sub-frames within a communication frame of the communication frames.

11. A wireless communication system as claimed in claim 1, wherein:
the location specifying circuitry comprises a GPS receiver.

12. A wireless communication system as claimed in claim 1, wherein:
the antenna system is arranged to receive an initial signal from the further antenna system advising of availability for the connection setup signal to be issued, and providing information regarding the identified timing window.

13. A wireless communication system as claimed in claim 12, wherein:
the initial signal further provides an antenna system identifier for the further antenna system; and
the distance computation circuitry is arranged to access a storage that maps antenna system identifiers to location information for associated antenna systems in order to determine the location information for the further antenna system.

14. A wireless communication system as claimed in claim 1, wherein the moving vehicle is an aircraft.

15. A method of performing a timing adjustment in a wireless communication system for a moving vehicle having an antenna system to communicate with a further antenna system, comprising:
performing a sign-on procedure to seek to establish a communication link with the further antenna system, during which a connection setup signal is issued via the antenna system for receipt by the further antenna system within an identified timing window;
identifying a current location of the wireless communication system; and
obtaining location information specifying a location of the further antenna system and determining a separation distance between the antenna system and the further antenna system, wherein:
during the sign-on procedure the connection setup signal is issued at a default time unless the separation distance exceeds a setup threshold distance that indicates that use of the default time would prevent the connection setup signal being received within the identified timing window, in which event a timing advance is applied in order to issue the connection setup signal prior to the default time so as to cause the connection setup signal to be received by the further antenna system within the identified timing window;
when a communication link is established between the antenna system and the further antenna system, a response signal identifying a further timing advance is received by the antenna system;

when the connection setup signal was issued by applying the timing advance, both the timing advance and the further timing advance are used to control timing of a subsequent uplink communication to the further antenna system;

communications between the antenna system and the further antenna system occur within communication frames; and the further antenna system controls allocation of sub-frames within each communication frame, and when a communication link is established between the antenna system and the further antenna system, the response signal received by the antenna system further identifies the sub-frames allocated for uplink and downlink communication between the antenna system and the further antenna system, the method further comprising:

choosing each sub-frame allocated to the antenna system for uplink communication based on the separation distance, such that a receive/transmit timing constraint will not be violated when both the timing advance and the further timing advance are used to control timing of a subsequent uplink communication to the further antenna system, wherein a number of sub-frames in multiple sub-frames that can be allocated for uplink communication is dependent on a maximum supported separation distance between the antenna system and the further antenna system.

* * * * *